United States Patent
Dow et al.

(10) Patent No.: US 8,930,987 B2
(45) Date of Patent: Jan. 6, 2015

(54) SYSTEMS AND METHODS FOR ADAPTIVELY TRANSMITTING MEDIA AND ADVERTISING CONTENT

(75) Inventors: Christopher Dow, San Francisco, CA (US); Eric Grab, San Diego, CA (US); Walt Klappert, Los Angeles, CA (US); Jim Theberge, Santa Clara, CA (US); Paul T. Stathacopoulos, San Carlos, CA (US)

(73) Assignee: United Video Properties, Inc., Santa Clara, CA (US)

( * ) Notice: Subject to any disclaimer, the term of this patent is extended or adjusted under 35 U.S.C. 154(b) by 430 days.

(21) Appl. No.: 13/436,121

(22) Filed: Mar. 30, 2012

(65) Prior Publication Data
US 2013/0263178 A1 Oct. 3, 2013

(51) Int. Cl.
| | | |
|---|---|---|
| H04N 7/10 | (2006.01) | |
| H04N 7/025 | (2006.01) | |
| G06F 3/00 | (2006.01) | |
| G06F 13/00 | (2006.01) | |
| H04N 5/445 | (2011.01) | |
| G06Q 30/00 | (2012.01) | |

(52) U.S. Cl.
USPC .............................. 725/32; 725/42; 705/14.4

(58) Field of Classification Search
None
See application file for complete search history.

(56) References Cited

U.S. PATENT DOCUMENTS

| | | | |
|---|---|---|---|
| 6,950,623 | B2 | 9/2005 | Brown |
| 7,086,077 | B2 | 8/2006 | Giammaressi |
| 7,394,850 | B1 | 7/2008 | Gordon |
| 7,577,714 | B2 | 8/2009 | Saunders |
| 8,055,894 | B2 | 11/2011 | Baker |
| 2002/0026638 | A1 | 2/2002 | Eldering |
| 2008/0046917 | A1 | 2/2008 | De Heer |
| 2008/0250445 | A1 | 10/2008 | Zigmond |
| 2009/0025027 | A1 | 1/2009 | Craner |
| 2009/0158311 | A1 | 6/2009 | Hon |
| 2009/0187939 | A1 | 7/2009 | Lajoie |
| 2009/0300675 | A1 | 12/2009 | Shkedi |
| 2010/0293044 | A1* | 11/2010 | Kozai ............................ 705/14.4 |
| 2011/0246661 | A1 | 10/2011 | Manzari |
| 2011/0296458 | A1 | 12/2011 | Di Mattia |
| 2011/0307924 | A1 | 12/2011 | Roberts |
| 2012/0110620 | A1* | 5/2012 | Kilar et al. ...................... 725/34 |
| 2012/0222056 | A1 | 8/2012 | Donoghue |

FOREIGN PATENT DOCUMENTS

WO    WO-2004036384    4/2004

* cited by examiner

Primary Examiner — Nathan Flynn
Assistant Examiner — Omar S Parra
(74) Attorney, Agent, or Firm — Ropes & Gray LLP

(57) ABSTRACT

Embodiments provide methods and systems for presenting advertisements associated with a particular media. The advertisement may have several versions, any one of which may be presented, based on several factors, including the length of time between transmission and receipt of any particular version. The transmission of the advertisements and related media content is optimize in order seamlessly transition between advertisements and media content.

22 Claims, 22 Drawing Sheets

SYSTEMS AND METHODS FOR ADAPTIVELY TRANSMITTING MEDIA AND ADVERTISING CONTENT

BACKGROUND

In conventional systems, advertisements are often associated and displayed with media content. As media content has evolved to include audio, video and interactive content or applications, so have the advertisements. Advertisements now include many of the features associated with the various types of media content.

The more complex an advertisement becomes, the more bandwidth is required to transmit the advertisement. Bandwidth is a measure of available or consumed data communication resources expressed in bits/second or multiples of it (kilobits/s, megabits/s, etc.). As media content and advertisements must share the amount of bandwidth, the transmission of the increasingly complex advertisements often conflicts with the transmission of media content. Furthermore, the amount of available bandwidth may change instantaneously, resulting in a slow down, or lack of, transmission of both the advertisement and the media content.

This is particularly troublesome when streaming media content and advertisements. If the transmission is interrupted due to lack of bandwidth, the advertisement or media content may experience breaks in the continuity of its presentation (e.g., creating jumps and pauses). Pausing the presentation, even for a short time, may cause the user to lose interest in the media and abandon its viewing.

SUMMARY OF DISCLOSURE

Accordingly, methods and systems are described herein for providing multiple versions of an advertisement associated with a media listing, or the media itself, substantially simultaneously in order to provide seamless presentations of advertisements and media content.

While a high quality advertisement may be preferred, bandwidth constraint may hinder the ability of the high quality advertisement to be sufficiently transmitted to a user. For example, as a user views the high quality advertisement, the high quality advertisement might experience breaks in continuity (e.g., jitters, jumps or pauses) during the presentation. Therefore, a low quality version of the advertisement may be transmitted substantially simultaneously with the high quality advertisement.

The low quality advertisement may transmit more quickly and use less bandwidth than the high quality advertisement, so bandwidth constraints may not affect (e.g., cause jitters, jumps or pauses) the low quality advertisement as much as they affect the high quality advertisement. Furthermore, as the low quality advertisement may have a substantially lower bit rate, the transmission of the low quality advertisement does not substantially interfere with the transmission of the high quality advertisement. Finally, as the low quality advertisement is transmitted substantially simultaneously, there will be no delay or lag waiting for the low quality version to transmit.

In some embodiments, a targeted advertisement may be associated with media content (e.g., a movie). While a user is presented with the media content listing (e.g., the title of the movie), multiple versions of the advertisement (e.g., a high quality version and a low quality version) may be transmitted substantially simultaneously to the user. When the user selects the media content (e.g., clicks on the movie title), the version of the advertisement that is sufficiently transmitted may be presented to the user, prior to the start of the media content. If both versions are sufficiently transmitted, a preferred version (e.g., the high quality version) may be presented to the user.

In some embodiments, the method comprises generating a display of a media listing and identifying an advertisement associated with that listing. While a user is presented with the listing, multiple versions of the advertisement may be transmitted substantially simultaneously to the user. The length of time between the transmission of the advertisement versions and reception of the user's media selection can then be determined. Based on this determination, a sufficiently transmitted version of the advertisement may be selected to be seamlessly presented with the user's selected media content.

In some embodiments where multiple versions of an advertisement are transmitted, the multiple versions are associated with different qualities of the advertisement. For example, there may be a first and second version of the advertisement and a first and second quality associated with each version. As the quality of the versions may be different, one version may have a higher or lower quality than the other. In addition, some embodiments may include three or more versions of the advertisement, all of which may be transmitted substantially simultaneously.

In some embodiments, the determination of which particular version is displayed to the user is based upon the length of time between the transmission of the advertisement versions and reception of the user's media selection. The determination may consider a user's history or profile in determining which versions of an advertisement should be displayed to the user. In addition, the determination may include past, current and future link speed or environmental factors.

In some embodiments, after presenting either the first or second version of the advertisement, a point (i.e. the beginning, middle or end of a segment) may be determined for stopping the version currently being presented (e.g., the low quality version) and begin presenting the un-presented version (e.g., the high quality version). The determination of the point may be based upon the length of time between the transmission of the advertisement versions and reception of the user's media selection, the progress of the transmission, or the quality of the media content. The determination of the point may also consider past, current and future link speed, user profiles and histories, environmental factors and/or other additional factors.

In some embodiments, a high quality advertisement and a low quality advertisement may be transmitted substantially simultaneously for multiple media listings (e.g., for two or more movies). In some embodiments, only a high quality advertisement may be transmitted for one media listing (e.g., a popular movie) and only a low quality advertisement may be transmitted for another media listing (e.g., an unpopular movie). The two advertisements may then be transmitted substantially simultaneously to the user, so that no matter which media listing the user selects (e.g., either the popular movie or the unpopular movie), an advertisement will be transmitted and presented.

The system or method may determine the likelihood that the user may select one media listing (e.g., the popular movie) over another media listing (e.g., the unpopular movie). Based on this likelihood, the system or method may assign a version of each advertisement (e.g., either a high quality version or a low quality version) to be transmitted.

Due to bandwidth constraint, it may be difficult to transmit the preferred version (e.g., the high quality version) of each advertisement associated with each media listing to the user before the user selects one of the media listings. If the advertisements are not sufficiently transmitted before the user selects a media listing, the user may experience a pause before the associated advertisement is presented or experience breaks in continuity (e.g., jitters, jumps or pauses) during the presentation.

The pauses or continuity breaks may cause a user to lose interest in the media listing and abandon viewing the contents of the media listing. Therefore, the version (e.g., high or low quality) of each advertisement associated with each media listing may be selected, or prioritized, based on the likelihood that the user will select each media listing. In this way, the bandwidth used to transmit preferred (e.g., high quality) versions of the advertisements are optimized based on the available bandwidth, and the likelihood that the user will experience pauses or continuity breaks in the presented advertisement is minimized.

In some embodiments, the method comprises transmitting a first media listing for a first media and a second media listing for a second media to a user. The first media is associated with a first advertisement, and the second media is associated with a second advertisement. A determination of the likelihood that a user will select either listing is then made. Prior to a user selection of one of the media listings, a selection of a first version of the first advertisement and a second version of the second advertisement is made based on the determined likelihoods, and the selected versions are transmitted to the user substantially simultaneously.

In some embodiments, the versions of the advertisement are associated with different qualities of the advertisement. For example, the first version of the first advertisement may have a first quality, and the second version of the second advertisement may have a second quality. The quality of the versions may be different, for example one version may have a higher or lower quality than the other. In addition, some embodiments may include multiple versions of the each advertisement, all of which may be transmitted substantially simultaneously. Some embodiments may also include three or more media listings, each with associated advertisements.

In some embodiments, the determined likelihoods may be based on a user profile or history, or the determinations may include past, current and future link speed or environmental factors.

In some embodiments, the selections of the versions of the first and second advertisements may also be based on a user's profile or history. In addition, the selection determinations may include past, current and future link speed or environmental factors. These methods may also be employed to determine the advertisements that are associated with any particular media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
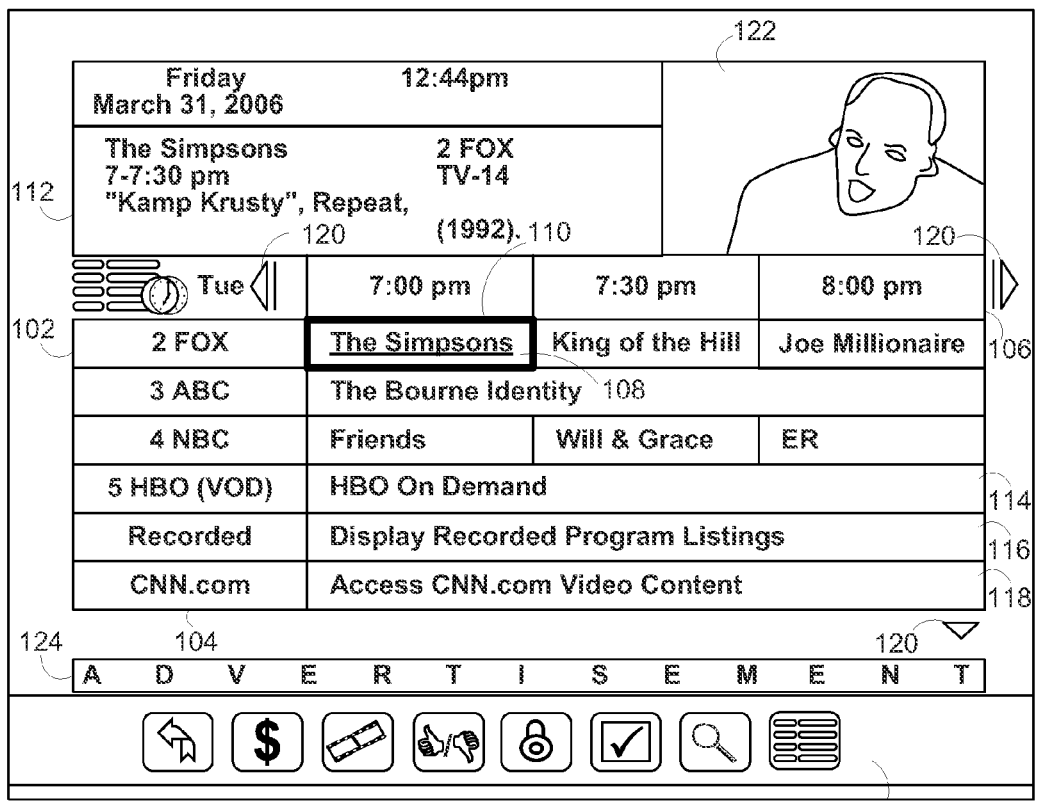
FIG. 1 shows an illustrative media listing display that may be used to provide media listings in accordance with some embodiments of the disclosure.

In some systems, limited bandwidth and other factors create constraints on the amount of data that may be transmitted or the length of time that may be used to transmit the data. Consequently, the transition between the advertisement and the media (i.e. the point when the advertisement concludes and the media begins), or vice versa, may be affected. Similarly, the period following a user selection and before a "preroll" advertisement or media begins may also be affected. A "pre-roll" advertisement is an advertisement designed to play after the selection of a media listing, but before the content of the media listing is shown.

Media listings may take various forms depending on the type of device on which the listing is displayed and the type of content represented by the listing. Furthermore, the device on which the media listing display appears may comprise a media guidance application. A media guidance application is an application that, among other things, allows a user to navigate among and locate many types of content. In some contexts, for example, viewing a web-site page, the media listings are arranged upon the media listing display according to a predefined code based upon the particular user device.

As referred to herein, the term "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media, television programming, as well as pay-per-view programs, on-demand programs (as in video-on-demand ("VOD") systems), or multimedia and/or combination of the same. Media listing displays also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television, website, or any type of on-screen display.

One of the functions of the media listing display is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
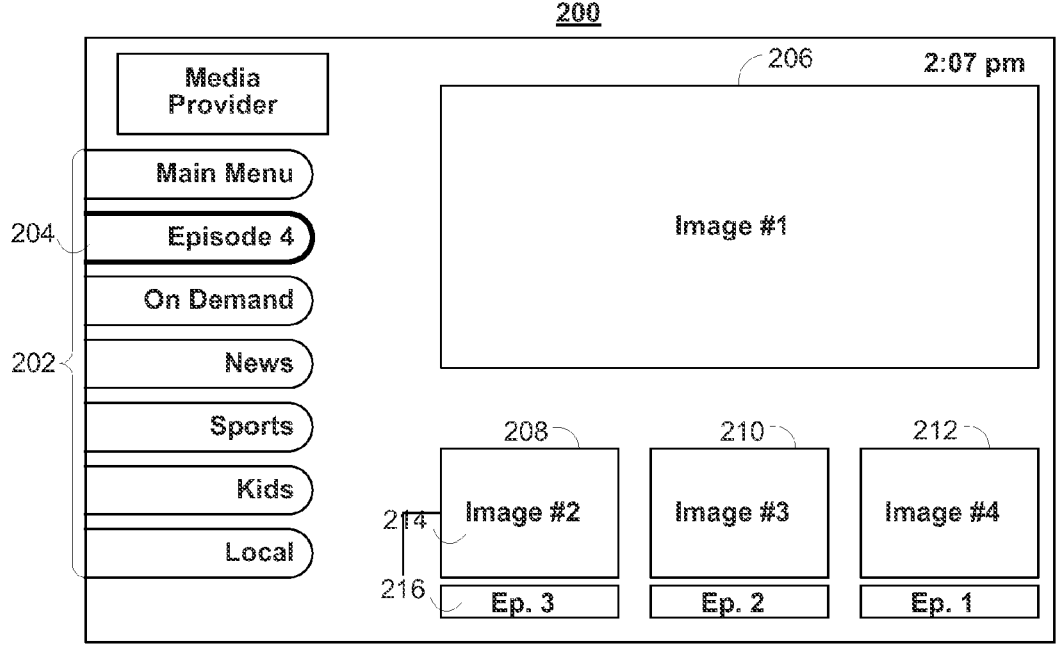
FIG. 2 shows another illustrative media listing display that may be used to provide media listings in accordance with some embodiments of the disclosure.

FIGS. 1-2 show illustrative media listing displays that may be used to provide media guidance data. The media listing displays shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a media listing display (e.g., a menu option, a listings option, an icon, a hyperlink, etc.) or pressing a dedicated button (e.g., a GUIDE button) on a remote control or other user input interface or device. In response to the user's indication, the media listing display may provide media guidance data organized in one of several ways, such as by time and channel in a grid, by time, by channel, by source, by content type, by program, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid media listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of media listings, such as media listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include interactive media applications, programs, video data, audio data, games, web events, such as a chat session or Webcast, documents, or content available on-demand as streaming content or downloadable content through an Internet web site or other Internet access (e.g. FTP). For example, a web-site may provide a media listing 108 of an available television program, movie, game or other interactive media.

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, only of the most recently updated programs, only of recently added movies, only of a particular genre of content, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device, moving a mouse cursor or pointer, or moving a scroll bar may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in U.S. Pat. No. 6,564,378, issued May 13, 2003 to Satterfield et al. and U.S. Pat. No. 6,239,794, issued May 29, 2001 to Yuen et al., which are hereby incorporated by reference herein in their entireties. PIG displays may be included in other media listing displays of the embodiments described herein.

Advertisement 124 may be associated with the content of media listing 108. Furthermore, advertisement 124 may be displayed before, during or after either the selection of media listing 108 or the display of media listing 108. Advertisement 124 may be of the same form as the content of media listing 108 (e.g., advertisement 124 is a video where the content of media listing 108 is a video), or advertisement 124 may be of a different form from the content of media listing 124 (e.g., advertisement 124 is a video where the content of media listing 108 is an interactive game). Furthermore, advertisement 124 may be displayed in between portions of the content of the media listing 108, or concurrently with the display of the content of the media listing 108.

Advertisement 124 may be displayed in the same window (e.g., where the content of media listing 108 is shown in a new window, the content may be preceded by a display of advertisement 124 in the same window) or portion of the screen as the content of the media listing 108 (e.g., a full screen display of a video content may be preceded by a full screen display of advertisement 124).

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the media listings 108 in grid 102. Advertisement 124 may also be for products or services related or unrelated to the content displayed in grid 102 or media listing 108. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown in FIG. 1 as rectangular or banner shaped, advertisements may be provided, permanently or temporarily, in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media listing displays of the embodiments described herein.

Options region 126 may allow the user to access different types of content, media guidance application displays, and/or media guidance application features. Options region 126 may be part of display 100 (and other media listing displays described herein), or may be invoked by a user by selecting an on-screen option or pressing a dedicated or assignable button on a user input device. The selectable options within options region 126 may concern features related to program listings in grid 102 or may include options available from a main menu display.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005; Boyer et al., U.S. Pat. No. 7,165,098, issued Jan. 16, 2007; and Ellis et al., U.S. Patent Application Publication No. 2002/0174430, filed Feb. 21, 2002, which are hereby incorporated by reference herein in their entireties.

FIG. 2 shows another media listing display. FIG. 2, for example, may be a media listing display as it would appear on a web-site. The web-site may transmit streaming media to a user upon selection by the user of a particular title. The streaming media may be categorized or may show recently added programs or movies. The movies or programs may be associated with targeted advertisements that are also provided as streaming media. In some embodiments, the pre-roll advertisements may begin being transmitted as soon as the user enters or accesses the web-site.

Video mosaic display 200 includes selectable options 202 for content information organized based on content type, genre, and/or other organization criteria. These tabs may correspond to the menu tabs of the media listing display.

In display 200, program listing option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing.

For example, listing 206 may have been selected by a user and is currently being presented. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
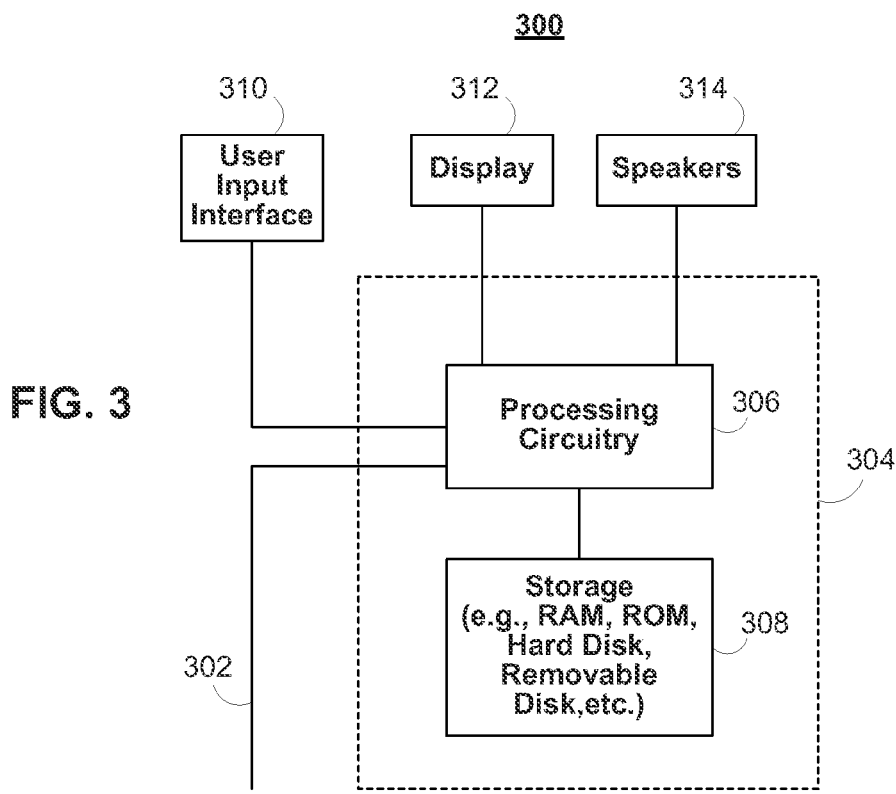
FIG. 3 is a block diagram of an illustrative user equipment device in accordance with some embodiments of the disclosure.

Users may access content from one or more of their user equipment devices. FIG. 3 shows a generalized embodiment of illustrative user equipment. The generalized embodiment may be applied to various devices described through the application. For example, FIG. 3 may be a user device used for receiving streaming media including, but not limited to, a smartphone.

More specific implementations of user equipment devices are discussed below in connection with FIG. 4. User equipment device 300 may receive content and data via input/output (hereinafter "I/O") path 302. I/O path 302 may provide content (e.g., Internet content, broadcast programming, on-demand programming, content available over a local area network (LAN) or wide area network (WAN), and/or other content) and data to control circuitry 304, which includes processing circuitry 306 and storage 308. Storage 308 may be used to permanently or temporarily store data and/or quickly retrieve the stored data (e.g., buffer and/or cache the data). A buffer a physical memory storage used to temporarily hold data while it is being moved from one place to another. A cache is a permanent storage of data. Throughout this disclosure, buffering and caching may be used interchangeably and examples using one may incorporate the other. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 executes instructions for sending or retrieving a user profile stored in memory (e.g., storage 308). In some embodiments, control circuitry 304 may receive user input for selecting media content located on other user equipment. Control circuitry 304 may automatically send the user profile to other user equipment before selecting media content. In particular, the control circuitry 304 on the other user equipment device may use the user profile to determine an advertisement to transmit to the user for presentation on display 312. In some embodiments, control circuitry 304 may coordinate the transmission of the media listing content with other equipment (i.e. other user equipment or remote servers).

In client-server based embodiments, control circuitry 304 may include communications circuitry suitable for communicating with a remote server, advertisement server, or other networks or servers. The instructions for carrying out the above mentioned functionality may be stored on remote server or the user device. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below) or communication with other devices. In particular, the communications circuitry may be suitable for communicating over a network with other devices such as a media content source.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits.

Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, segmenting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the media listing display and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The media listing display may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media listing display is a client-server based application. Data for use by a thick or thin client implemented on user equipment device 300 is retrieved on-demand by issuing requests to a server remote to the user equipment device 300. In one example of a client-server based system, control circuitry 304 runs a web browser that interprets web pages provided by a remote server.

In some embodiments, the program listing display is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the display may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the display may be, for example, encoded and transmitted in an MPEG-2 object carousel with the MPEG audio and video packets of a program.

Figure 4:
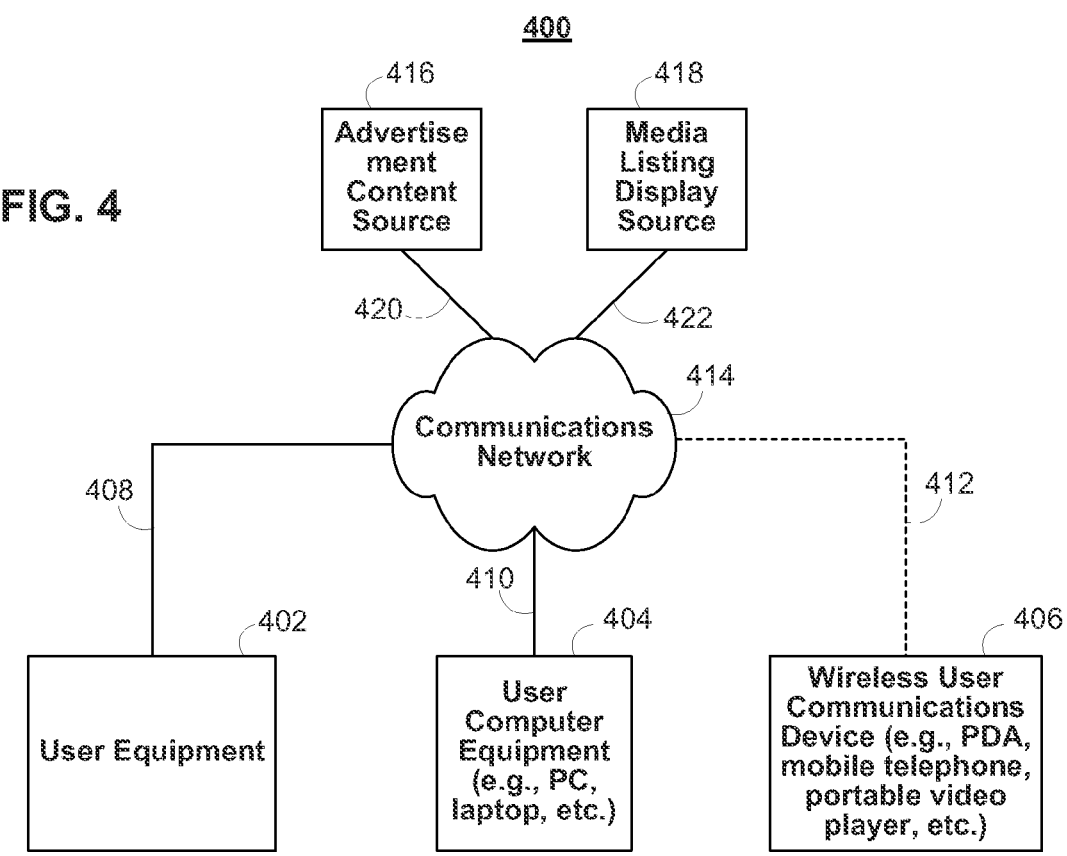
FIG. 4 is a block diagram of an illustrative media system in accordance with some embodiments of the disclosure.

User equipment device 300 of FIG. 3 can be implemented in system 400 of FIG. 4 as user equipment 402, user computer equipment 404, wireless user communications device 406, or any other type of user equipment suitable for accessing content, such as a non-portable gaming machine. For simplicity, these devices may be referred to herein collectively as user equipment, user equipment devices or user device, and may be substantially similar to user equipment devices described above. User equipment devices, on which a media listing display may be implemented, may function as a standalone device or may be part of a network of devices. Various network configurations of devices may be implemented and are discussed in more detail below. For example, FIG. 4 may show a user device including, but not limited to, a smartphone requesting streaming media from a content provider across the Internet.

A user equipment device utilizing at least some of the system features described above in connection with FIG. 3 may not be classified solely as user equipment 402, user computer equipment 404, or a wireless user communications device 406. For example, user equipment 402 may, like some user computer equipment 404, be Internet-enabled allowing for access to Internet content, while user computer equipment 404 may, like some user equipment 402, include a tuner allowing for access to television programming. The media listing display may have the same layout on various different types of user equipment or may be tailored to the display capabilities of the user equipment. For example, on user computer equipment 404, the media listing display may be provided as a web site accessed by a web browser on a desktop computer. In another example, the media listing display may be scaled down or may including different formatting for wireless user communications devices 406.

In the media display system 400, there may be more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 414. Namely, user equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as short-range point-to-point communication paths, such as USB cables, IEEE 1394 cables, wireless paths (e.g., Bluetooth, infrared, IEEE 802-11x, etc.), or communication via wired or wireless paths. BLUETOOTH is a certification mark owned by Bluetooth SIG, INC. The user equipment devices may also communicate with each other directly through an indirect path via communications network 414.

Media display system 400 includes advertisement content source 416 and media listing display source 418 coupled to communications network 414 via communication paths 420 and 422, respectively. Paths 420 and 422 may include any of the communication paths described above in connection with paths 408, 410, and 412. Communications with the advertisement content source 416 and media listing display source 418 may be exchanged over one or more communications paths, but are shown as a single path in FIG. 4 to avoid overcomplicating the drawing. In addition, there may be more than one of each of advertisement content source 416 and media listing display source 418, but only one of each is shown in FIG. 4 to avoid overcomplicating the drawing. (The different types of each of these sources are discussed below.) If desired, advertisement content source 416 and media listing display source 418 may be integrated as one source device. Although communications between advertisement content source 416 and media listing display source 418 with user equipment devices 402, 404, and 406 are shown as through communications network 414, in some embodiments, advertisement content source 416 and media listing display source 418 may communicate directly with user equipment devices 402, 404, and 406 via communication paths (not shown) such as those described above in connection with paths 408, 410, and 412.

Advertisement content source 416 and media listing display source 418 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Advertisement content source 416 and media listing display source 418 may be the originator of content (e.g., a television broadcaster, a Webcast provider, etc.) or may not be the originator of content (e.g., an on-demand content provider, an Internet provider of content of broadcast programs for downloading, etc.). Advertisement content source 416 and media listing display source 418 may include cable sources, satellite providers, on-demand providers, Internet providers, over-the-top content providers, or other providers of content. Advertisement content source 416 and media listing display source 418 may also each include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media listing display source 418 may provide media guidance data, such as the media guidance data described above. Media guidance data may be provided to the user equipment devices using any suitable approach. In some embodiments, the media listing display may be a stand-alone interactive media guide that receives program guide data via a data feed (e.g., a continuous feed or trickle feed). Available programs and other media guidance data may be provided to the user equipment by any suitable data transmission technique.

In some embodiments, guidance data from media listing display source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with media listing display source 418 to obtain media guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media listing display source 418 may provide user equipment devices 402, 404, and 406 the media guidance application itself or software updates for the media guidance application.

Media listing displays may be, for example, stand-alone applications implemented on user equipment devices. For example, the media listing displays may be implemented as software or a set of executable instructions which may be stored in storage 308, and executed by control circuitry 304 of a user equipment device 300. In some embodiments, media guidance applications may be client-server applications where only a client application resides on the user equipment device, and the server application resides on a remote server. For example, media listing displays may be implemented partially as a client application on control circuitry 304 of user equipment device 300 and partially on a remote server as a server application (e.g., media listing display source 418) running on control circuitry of the remote server. When executed by control circuitry of the remote server (such as media listing display source 418), the remote server may generate the media listing displays and transmit the generated displays to the user equipment devices. The server application may instruct the control circuitry of the media listing display source 418 to transmit data for storage on the user equipment. The client application may instruct control circuitry of the receiving user equipment to generate the media listing displays.

Advertisement content source 416 may provide media guidance data or more particularly advertisements. The advertisements provided by the advertisement content source may be any of those described above. Advertisements may be provided to the user equipment devices using any suitable approach. In some embodiments, user equipment 402 or the media listing display source 418 may receive the advertisements from the advertisement content source via a data feed (e.g., a continuous feed or trickle feed). Available advertisements may also be provided to the user equipment 402 and media listing display source 418 by any suitable data transmission technique.

In some embodiments, multiple media contents may travel together from a single source. The media contents may be combined in various ways, for example, multiplexing video packets or segments of video. The media listing display source 418 could take packets or even segments of video data from advertisements encoded in MPEG 4 (the fourth major version of specifications for video from the Motion Picture Expert Group) for example and interleave those parts with segments of media content, which also happen to be encoded in MPEG 4, but could as easily be in some other standard. Alternatively, multiple streams of data encoded in MPEG 4 could be wrapped within Internet Protocol (IP) packets. Then the IP packets would effectively be interleaved when they are transmitted from the server to the client. How efficiently the user equipment 402 can de-interleave and decode a specific type of packet may be a factor in deciding, which way is best for multiplexing the data for a given system.

In some embodiments, advertisements from the advertisement content source 416 may be provided to the user equipment 402 using a client-server approach. For example, a user equipment device may pull advertisements from a server, or a server may push advertisements to a user equipment device. In some embodiments, the user equipment 402 may initiate sessions with advertisement content source 416 to obtain advertisements when needed, e.g., when the user equipment device receives a request from the user to receive content associated with a media listing. Advertisements may be provided to the user equipment with any suitable frequency (e.g., continuously, daily, a user-specified period of time, a system-specified period of time, in response to a request from user equipment, etc.). Advertisement content source 416 may provide user equipment devices 402, 404, and 406 the advertisements itself or may provide the advertisements to the media listing display source 418.

Advertisements may be, for example, stand-alone objects implemented on user equipment devices. For example, advertisements may be implemented as software or a set of executable instructions which may be stored in storage 308, and executed by control circuitry 304 of a user equipment device 300, or advertisements may consists of a single file. In some embodiments, advertisement content source 416 may be a remote server configured to provide advertisements when requested. When executed by control circuitry of the remote server of the advertisement content source 416, the remote server may generate an advertisement and transmit the generated advertisement to the user equipment devices or the media listing display source 418. The media listing display source 418 may either request an advertisement based on its association with the content related to the media listing or may instruct the control circuitry of the media listing display source 418 to determine an advertisement for receipt from the advertisement content source 416.

Content, media guidance data, or advertisements delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media display system 400 is intended to illustrate a number of approaches, or network configurations, by which user equipment devices and sources of content and guidance data may communicate with each other for the purpose of accessing content and providing advertisements. The embodiments described herein may be applied in any one or a subset of these approaches, or in a system employing other approaches for delivering content and providing advertisements. The following two approaches provide specific illustrations of the generalized example of FIG. 4.

In one approach, user equipment 402 may communicate with the media listing display source 418 to request content associated with a media listing. The media listing display source 418 may determine the advertisements associated with the content of the media listing and request the advertisements from the advertisement content source 416 via the communications network 414. The advertisement content source 416 then transmits the advertisements associated with the content of the media listing to the media listing display source 418 via the communications network 414. The media listing display source 418 may then organize the received advertisements and the content of the media listing and transmit it to the user equipment 402 via communications network 414.

In a second approach, user equipment 402 may communicate with the media listing display source 418 to request content associated with a media listing. The media listing display source 418 may then communicate with the advertisement content source 416 via the communications network 414 and request advertisements associated with the content of the media listing. The advertisement content source 416 may determine the proper advertisements associated with the content of the media listings and transmit the selected advertisements to the media listing display source 418 via the communications network 414. The media listing display source 418 may then organize the received advertisements and the content of the media listing and transmit them to the user equipment 402 via communications network 414.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

As discussed herein, methods and systems are described for transmitting or receiving multiple versions of an advertisement associated with a media listing substantially simultaneously in order to optimize transitions between advertisements and media content.

Figure 5:
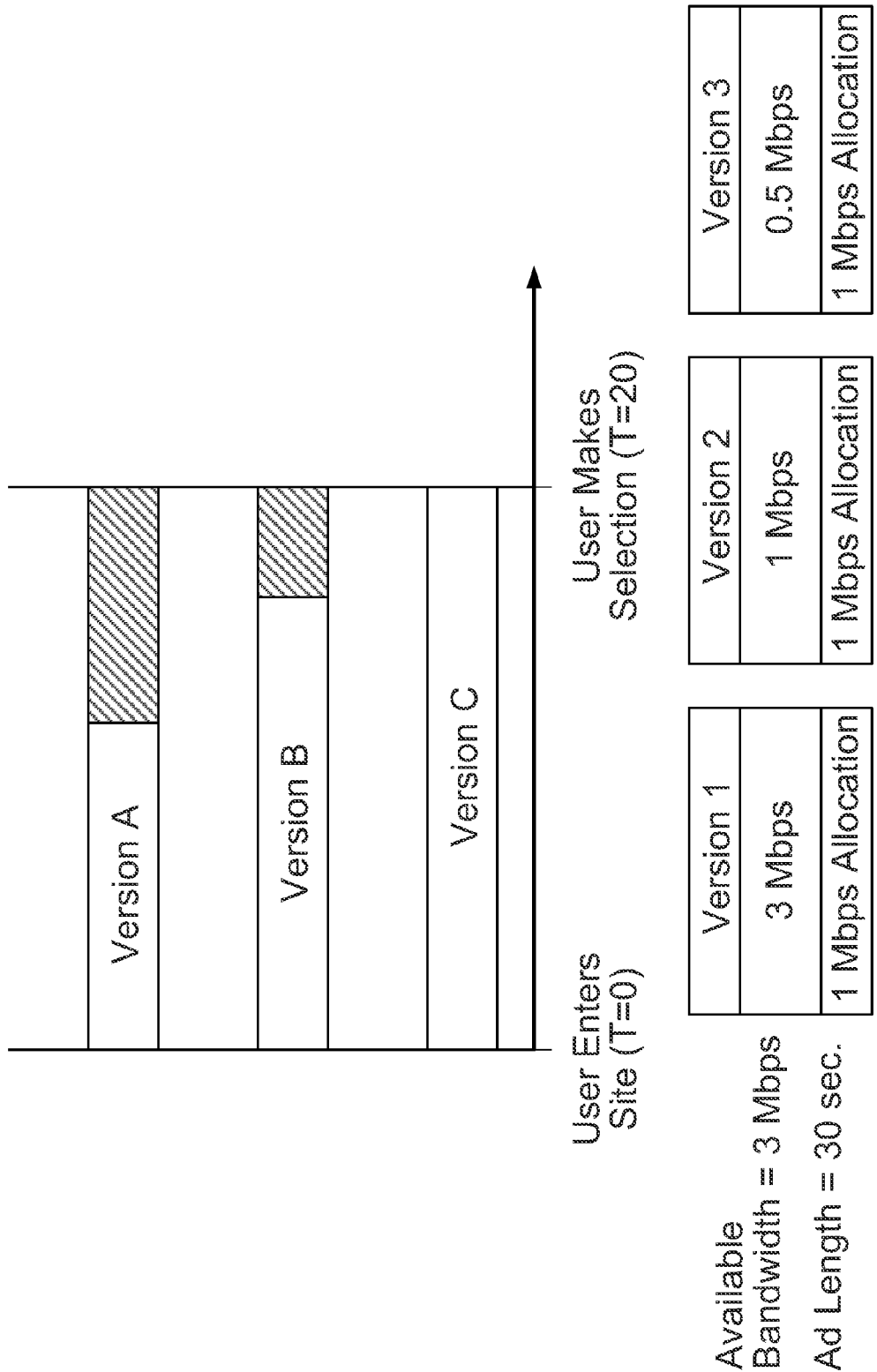
FIG. 5 is a graph relating to simultaneously transmitting multiple versions of an advertisement in some embodiments of the disclosure.

In some embodiments, multiple versions of an advertisement associated with a media listing, or the media itself, may be substantially simultaneously transmitted in order to provide seamless transitions of "pre-roll" advertisements and between advertisements and media content as shown in FIG. 5.

For example, when a user launches a web-site, which contains a media listing (Time=0), three versions of an advertisement associated with that media listing begin to be transmitted. For example, Version A has a play rate of 3 Mbps, Version B has a play rate of 1 Mbps, and Version C has a play rate of 0.5 Mbps. The play length of each version is thirty seconds, and each version is allocated 1 Mbps of the 3 Mbps bandwidth. By the time the user makes a selection (Time=20), only Version C has sufficiently transmitted. In this case Version C may be the version of the advertisement that is presented to the user.

Figure 6:
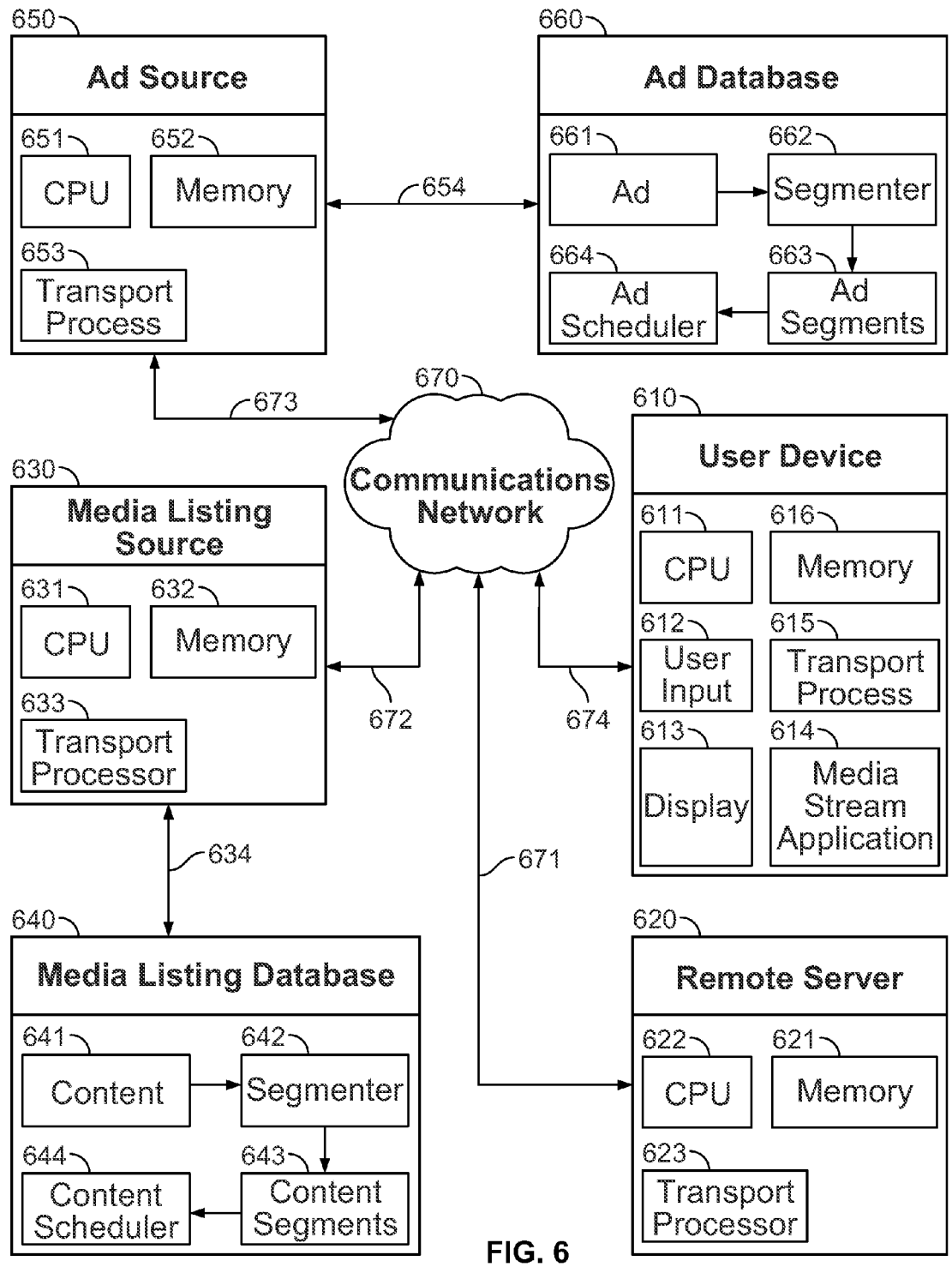
FIG. 6 is a block diagram of an illustrative media system in accordance with some embodiments of the disclosure.

FIG. 6 displays a block diagram of an illustrative media system in accordance with some embodiments of the disclosure. In some embodiments, the method and systems comprise generating a display of a media listing on a user device and identifying an advertisement associated with that listing. The advertisement and media listing may be located on a remote device. While a user is presented with the listing, multiple versions of the advertisement may be transmitted substantially simultaneously from the remote device to the user device. The length of time between the transmission of the advertisement versions and reception of the user's media selection on the user device may also be determined. Based on this determination, a particular version of the advertisement may be selected by a remote device to be displayed with the user's selected media content on the user device.

In FIG. 6, a user operates a user device 610 to interact with a communications network 670. The user device 610 may be any device suitable for supporting communications between user device 610 and media listing display source 630, media listing database 640, advertisement source 650, advertisement database 660, or remote server 620 via the communications network 670. The user device 610 may comprise a processor 611, a storage or memory device 616, a user input interface 612, a display screen 613, an application for streaming media application 614 and a transport processor 615.

The communications network 670 may be one or more networks including the Internet, a mobile phone network, mobile voice or data network (e.g., a 4G or LTE network), cable network, public switched telephone network, or other types of communications network or combinations of communications networks. Paths 671, 672, 673 and 674 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

The communications network 670 is further connected to advertisement source 650, media listing source 630, and remote server 620. Advertisement source 650 includes a processor 651, storage or memory 652 and transport processor 653. Advertisement source 650 may further include, or be connected via connection 654, to an advertisement database 660. The advertisement database 660 may include an advertisement 661, a segmenter 662, segmented advertisements 663, and an advertisement scheduler 664.

The communications network 670 is further connected to media listing source 630, which may include a processor 631, storage or memory 632 and transport processor 633. The media listing source 630 may further include media content 641, a segmenter 642, media content segments 643, and a content scheduler 644.

The communications network 670 is further connected to a remote server 620. The remote server 620 may include a processor 622, storage or memory 621, and a transport processor 623. In some embodiments, the remote server may further include the advertisement source 650 and/or the media listing source 630.

In some embodiments, a user may control the user device 610 through the user input interface 612. The processor 611 processes the commands using control circuitry, which may include directing the transport processor 615 to access the communications network. The user device 610 may communicate with the advertisement source 650, the media listing source 630, or the remote server 620. In response, the user device 610 may retrieve information that is stored in the memory 616 of the user device 610 or present media on the display 613 of the user device 610 using the media streaming application 614 of the user device 610.

In some embodiments, the user device 610 communicates with the remote server 620. The remote server 620 may retrieve a user profile from the memory 616 of the user device 610, the memory 621 of the remote server 620, or any other point accessible via the communications network 670, such as the advertisement source 650 or the media listing source 630. The remote server 620 may also receive a request from the user device 610 for media content 641 from the media listing source 630. Alternatively, the user device may contact the media listing source 630 directly. The processor 631 of the media listing source 630 may process the request. The media content 641 may be located at the memory 632 of the media listing source 630 or may be located at the media listing database 640. The media listing database may contain the media content 641. The media content 641 may also be stored in a media content source found within the media listing source 630.

The media listing database 640 may create media content segments 643 by using the segmenter 642. The media content segments 643 are portions of the individual media content 641. The media content segments 643, when displayed in series, constitute media content 641. For example, a thirty second media content 641 may comprise ten media content segments 643 each with a three second play length. Alternatively, a thirty second media content 641 may comprise three media content segments 643 each with a ten second play length. Furthermore, a thirty second media content 641 may comprise any number of media content segments 643 each with different play lengths that sum to thirty seconds.

Each media content 641 version may comprise media content segments 643. The media content segments 643, whether from a single version of the media content 641 or multiple versions of the media content 641, may be arranged using a content scheduler 644 into a single media content 641. The media listing source 630 may transmit the media content segments 643 to the remote server 620, the advertisement source 650, or the user device 610. The remote server 620 may determine that the media content 641 should be associated with advertisement 661 based on the user profile.

Alternatively, the remote server 620 may transmit the user profile and media content 641 to the advertisement source 650, where the advertisement source 650 will determine what advertisement to associate with the media content 641. In some embodiments, the user device 610 may determine an advertisement 661 to associate with the media content 641. In some embodiments, the advertisement 661 may be selected without regard to the user profile. In some embodiments, the advertisement 661 may be selected based on preferences of an advertiser or the provider of media content 641.

The remote server 620 may request advertisement 661 from the advertisement source 650. The processor 651 may receive the request and retrieve the advertisement 661. The advertisement 661 may be located at memory 652 of the advertisement source 650. The advertisement source 650 may use the transport processor 653 to request the advertisement from the advertisement database 660. The segmenter 662 may create advertisement segments 663 from the advertisement 661. The advertisement segments 663 are portions of the individual advertisement 661. The advertisement segments 663, when displayed in series, constitute an advertisement 661.

Each advertisement 661 version may comprise multiple advertisement segments 663. For example, a thirty second advertisement 661 may comprise ten advertisement segments 663 each with a three second play length. Alternatively, a thirty second advertisement 661 may comprise three advertisement segments 663 each with a ten second play length. Furthermore, a thirty second advertisement 661 may comprise any number of advertisement segments 663 each with different play lengths that sum to thirty seconds.

The advertisement segments 663, whether from a single version of an advertisement 661 or multiple versions of an advertisement 661, may be arranged using an advertisement scheduler 664 into a single advertisement 661. The advertisement segments 663 may also be arranged with the media content segments 643 using the advertisement scheduler 664. The advertisement source 650 may transmit the arranged advertisement segments 663 and media content segments 643 to the remote server 620, the media listing source 630, or the user device 610. The remote server 620 may combine the advertisement segments 663 and the media content segments 643 using the processor 622 on the remote server 620 and transmit them to the user device via the communications network. Alternatively, the advertisement segments 663 and the media content segments 643 may be combined at the advertisement source 650, the media listing source 630, or the user device 610.

The user device 610 may receive the advertisement segments 663 and the media content segments 643 via the transport processor 615 of the user device 610 and may use the media streaming application 614 to decode and play the advertisement segments 663 and the media content segments 643 on the display 613 of the user device 610.

Figure 7:
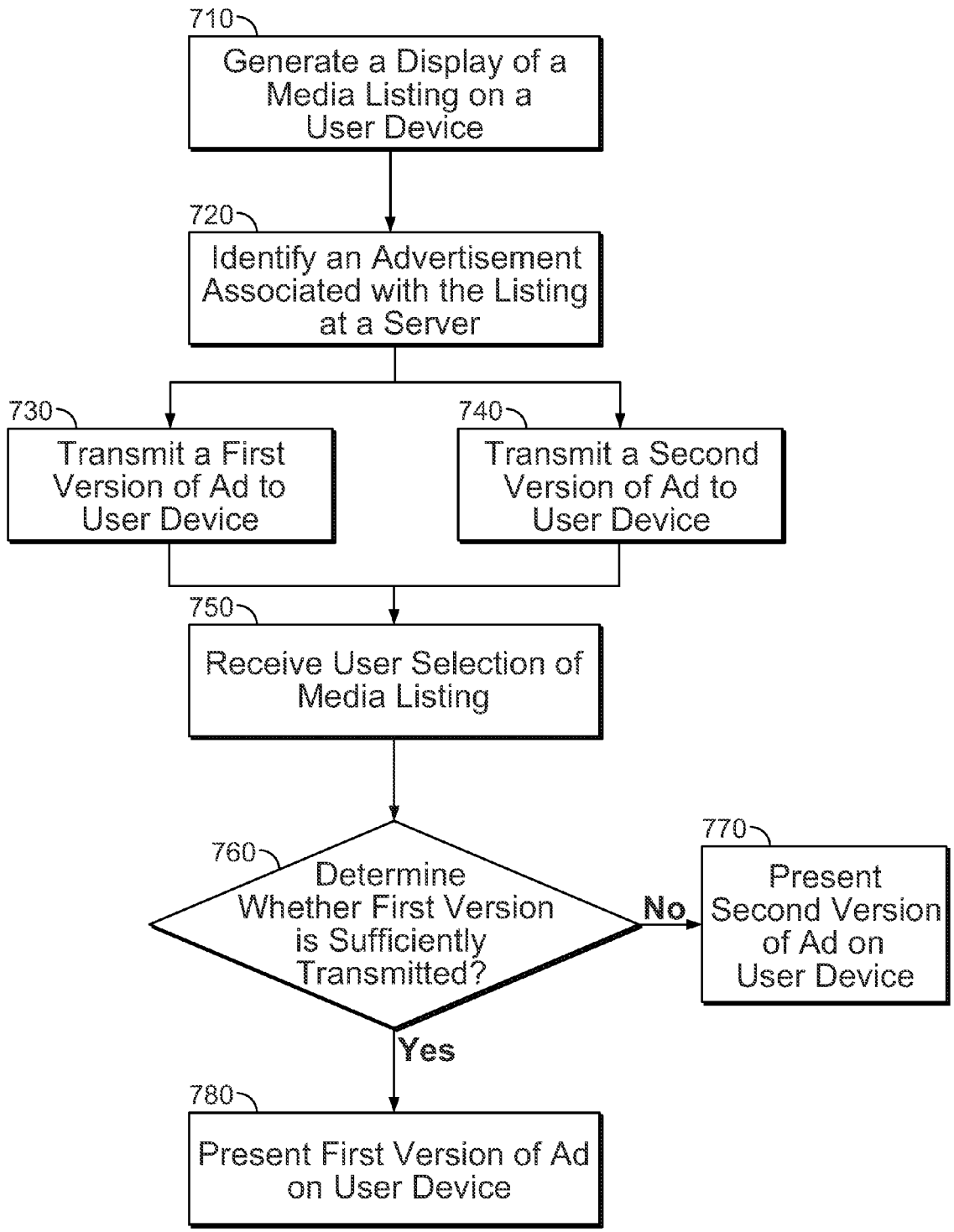
FIG. 7 is a flow-chart of illustrative steps involved in providing advertisements in a media system in accordance with some embodiments of the disclosure.

FIG. 7 is a flow-chart of illustrative steps involved in providing advertisements in a media system in accordance with some embodiments of the disclosure. FIG. 7 illustrates the steps of determining whether or not a particular version of an advertisement should be selected, including whether or not a particular version has been sufficiently transmitted.

At step 710, the system may generate a display of a media listing on the user device 610 (FIG. 6). The media listing may be displayed alongside a plurality of listings. The listings may be organized in any fashion. The media content may be located at media listing source 630 (FIG. 6). For example, a user may access a web-site, which displays a variety of streaming media files. Each file may be accessed after a user selects the title of the media file.

At step 720, the remote server 620 (FIG. 6) may identify an advertisement associated with the media listing. The remote server 620 (FIG. 6) may identify the advertisement locally or may transmit, receive or retrieve information via the communications network 670 (FIG. 6). The remote server 620 (FIG. 6) may identify the advertisement based on a user profile or a user history. In addition, the remote server may use a selection criterion or algorithm related to the media content.

The remote server may further determine what versions of the advertisement should be transmitted. For example, versions of the advertisement may differ by quality, file size or format. The remote server may further base the selection of versions on the user profile, user history, environmental factors, or a selection criterion or algorithm.

The quality of the connection between the user device 610 (FIG. 6), remote server 620 (FIG. 6), or any device accessible via the communications network 670 (FIG. 6) may also affect the version selected. The quality of the connection refers to the bit rate that may be transmitted at a particular time. A high bit rate relative to the typical bit rate capable of being transmitted, or the typical bit rate itself, may indicate that the quality of the connection is good. In contrast, a low bit rate relative to the typical bit rate capable of being transmitted would indicate that the quality of the connection is bad.

The quality of the connection may also consider packet loss and bit errors. Packet loss occurs when one or more packets of data travelling across a computer network fail to reach their destination. Bit errors are the number of received bits of a data stream over a communication channel that have been altered due to noise, which is the random fluctuation in electric signals, interference, distortion or bit synchronization errors.

The quality of the connection may be measured through the use of software such as BWPing or any other suitable method, for example, any suitable tool that measures bandwidth and response times between two hosts using Internet Control Message Protocol (ICMP) using an echo request/echo reply mechanism.

For example, if the quality of the connection between the user device 610 (FIG. 6) and the communications network 670 (FIG. 6) is relatively good, the selected versions may have better quality. Alternatively, if the quality of the connection between the user device 610 (FIG. 6) and the communications network 670 (FIG. 6) is relatively bad, the selected version may have lower quality. In some embodiments, the user profile or history may further affect the selection of versions. For example, if the user is likely to make a media listing selection quickly, the selected versions may be those that transmit more quickly.

At steps 730 and 740, a first version and a second version of the advertisement are transmitted to the user device 610 (FIG. 6). The transmission is substantially simultaneous and may occur via a single means of transmission. For example, the transmission of the first and second version of the advertisement may share the bandwidth of a single connection between the user device 610 (FIG. 6) and the communications network 670 (FIG. 6). The amount of bandwidth allocated to the transmission of either version may vary as explained in more detailed below. Furthermore, in some embodiments, the transmission of one version may also stop, until the transmission of the other version is complete. In some embodiments, three or more versions may be transmitted substantially simultaneously.

At step 750, the user device 610 (FIG. 6) receives a user selection of a media listing. As the transmission of the versions of the advertisement has already initiated, one version of the advertisement should be sufficiently transmitted to pre-roll before the media content related to the media listing begins. Sufficiently transmitted means that a break in continuity (e.g., a jitter, jump or pause) that a user experiences during the presentation of an advertisement or media content is substantially minimized given the network conditions.

For example, an advertisement may be sufficiently transmitted when the entire advertisement is buffered in memory 616 (FIG. 6) of user device 610 (FIG. 6), or an advertisement may be sufficiently transmitted when the amount of the advertisement buffered in memory 616 (FIG. 6) of user device 610 (FIG. 6) may allow the advertisement to be presented without breaks in continuity (e.g., jitters, jumps or pauses) given how much of the advertisement or media content remains to be transmitted and the network conditions.

At step 760, the remote server 620 (FIG. 6) or the user device 610 (FIG. 6) will determine whether the first version is sufficiently transmitted. If so, the remote server 620 (FIG. 6) may generate instructions to present the first version of the advertisement on the user device in step 780. If the first version is not sufficiently transmitted, the second version of the advertisement is presented on the user device 610 (FIG. 6) in step 770. It should be noted, some of the above steps may be executed or performed substantially simultaneously where appropriate or in parallel to reduce latency and processing times.

Figure 8A:
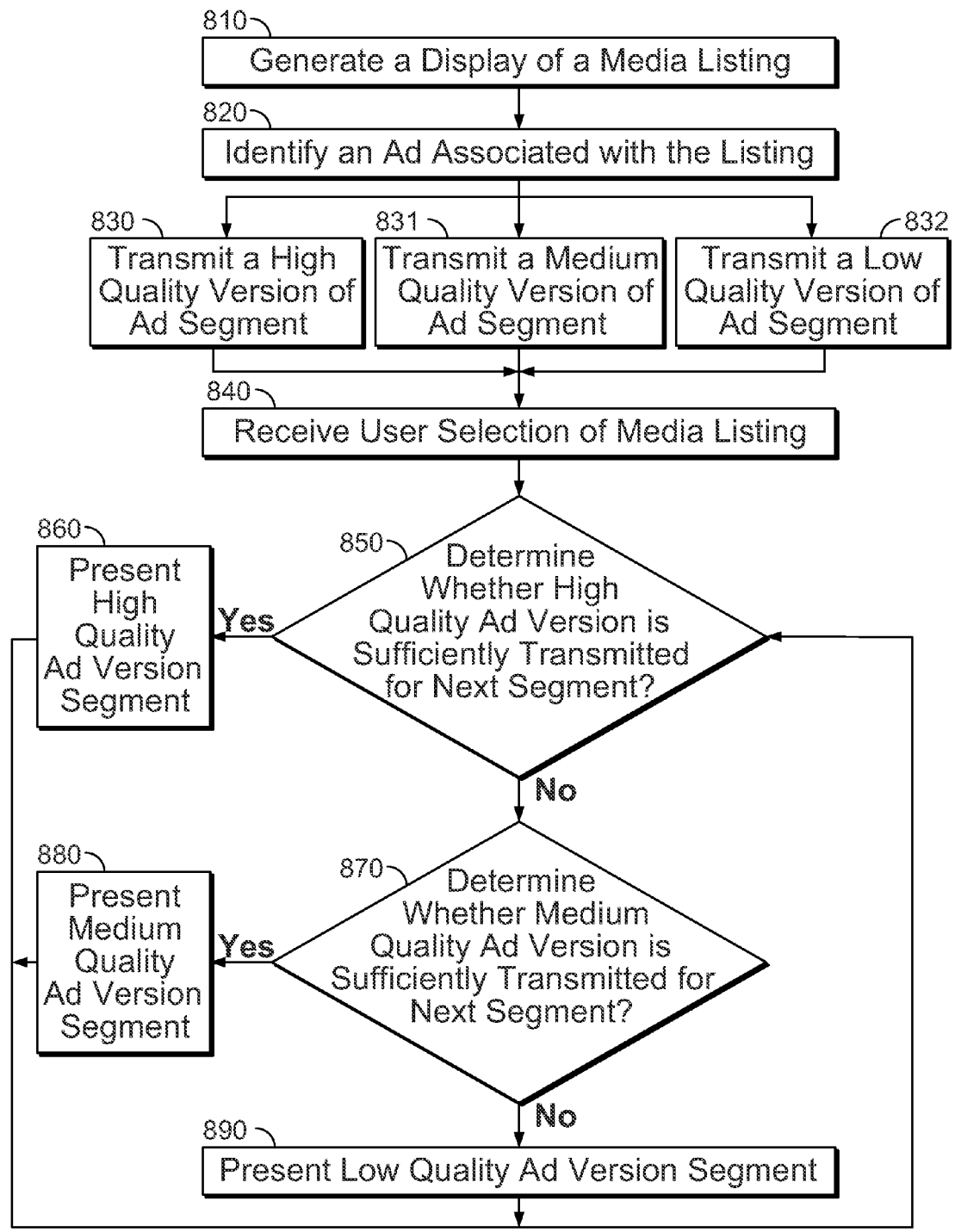
FIG. 8A is a flow-chart of illustrative steps involved in providing advertisement segments in a media system in accordance with some embodiments of the disclosure.

FIG. 8A is a flow-chart of illustrative steps involved in providing advertisements in a media system in accordance with some embodiments of the disclosure, which further includes incorporating advertisement segments. In some embodiments, after beginning to present one version of the advertisement, a point (i.e. the beginning, middle or end of a segment) may be determined for stopping the version currently being presented and begin presenting an un-presented version.

For example, the thirty second advertisement may have a high quality version and a low quality version. Furthermore, each version of the thirty second advertisement may comprise a series of ten advertisement segments, each advertisement segment having three second play lengths. The first advertisement segments begins transmission when the user accesses the media listings (T=0). After five seconds (T=5), both the first segment of the high quality version of the advertisement and the first and second segments of the low quality version of the advertisement may be sufficiently transmitted. Therefore, the high quality version could be presented for the first segment and the low quality version could be presented for the second segment. The determination point would then be at the end of the first segment.

The determination of the point may be based upon the length of time between the transmission of the advertisement versions and reception of the user's media selection, the progress of the transmission, or the quality of the media content. The determination of the point may also consider past, current and future link speed, user profiles and histories, environmental factors or other additional factors.

In some embodiments, a first and second version of an advertisement may be transmitted. The first and second versions may further be comprised of a series of segments (i.e. first, second, third, etc.). For example, a thirty second advertisement may comprise ten segments each with a three second play length. After playing the first segment of the first version of the advertisement, an increase (or decrease) in the available bandwidth may allow (or necessitate) presenting the second segment of the second version of the advertisement.

In some embodiments, step 810 may generate a display of a media listing on the user device 610 (FIG. 6). At step 820, the remote server 620 (FIG. 6) may identify an advertisement associated with the media listing. The remote server 620 (FIG. 6) may identify the advertisement locally or may transmit, receive or retrieve information via the communications network 670 (FIG. 6). The remote server 620 (FIG. 6) may identify the advertisement based on a user profile or a user history, or any of the means discussed above.

In some embodiments, the remote server 620 (FIG. 6) may further request advertisement 661 from the advertisement source 650 (FIG. 6) be transmitted in advertisement segments 663 (FIG. 6) using the segmenter 662. The advertisement segments 663 (FIG. 6) may be arranged using an advertisement scheduler 664 (FIG. 6). The advertisement segments 663 (FIG. 6) may then be transmitted to the remote server 620 (FIG. 6).

At steps 830, 831 and 832 several versions of the advertisement segments are transmitted to the user device 610 (FIG. 6) from the remote server 620 (FIG. 6). Any number of versions may be transmitted, and each version may vary by quality, file size or format. In FIG. 8A, a high quality segment at 830, a medium quality segment at 813, and a low quality segment at 832 are substantially simultaneously transmitted.

At step 840, the user device 610 (FIG. 6) receives a user selection of a media listing. As the transmission of the versions of the advertisement has already initiated, one version of the advertisement segment should be sufficiently transmitted to pre-roll before the media content related to the media listing begins.

At step 850, the remote server 620 (FIG. 6) or the user device 610 (FIG. 6) will determine whether the initial version, or the next high quality version in subsequent iterations, of the advertisement segment is sufficiently transmitted. If so, the remote server 620 (FIG. 6) may generate instructions to present the next high quality version of the advertisement segment on the user device in step 860. If the next high quality version of the advertisement segment is not sufficiently transmitted, the remote server 620 (FIG. 6) or the user device 610 (FIG. 6) will determine if the next medium quality version of the advertisement segment is sufficiently transmitted at step 870. If so, the remote server 620 (FIG. 6) may generate instructions to present the next medium quality version of the advertisement segment on the user device in step 880. If the next medium quality version of the advertisement segment is not sufficiently transmitted, the remote server 620 (FIG. 6) may generate instructions to present the next low quality version of the advertisement segment at 890.

After the initial advertisement segment has played the system may determine whether the next high quality version of the advertisement segment is sufficiently transmitted at step 850. The iterations may continue until all advertisement segments are displayed. It should be understood that the above steps of the flow diagrams of FIG. 8A may be executed or performed in any order or sequence not limited to the order and sequence shown and described in the figures. Also, some of the above steps of the flow diagrams of FIG. 8A may be executed or performed substantially simultaneously where appropriate or in parallel to reduce latency and processing times. Furthermore, in some embodiments the priority of the versions may change depending on the user profile or environment factors as discussed above.

Figure 8B:
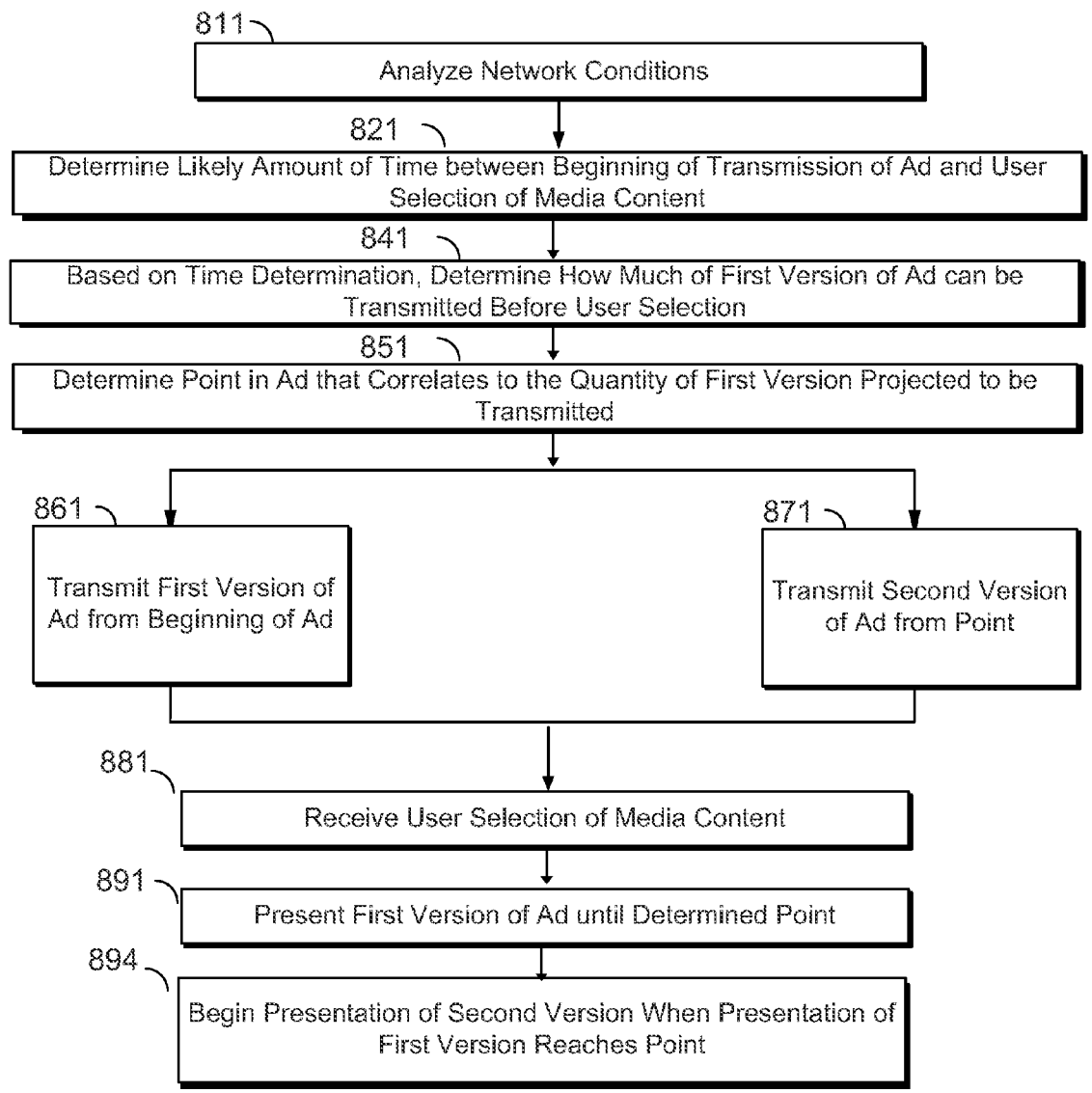
FIG. 8B is a flow-chart of illustrative steps involved in providing advertisement segments in a media system in accordance with some embodiments of the disclosure.

FIG. 8B is a flow-chart of illustrative steps involved in providing advertisements in a media system in accordance with some embodiments of the disclosure, which further includes determining a point for stopping the version currently being presented and presenting another version.

For example, a thirty second advertisement, with a high quality version and a low quality version, may be transmitted. The system may determine that due to bandwidth constraints only the first ten seconds of the high quality version of the advertisement may be sufficiently transmitted, but the remaining twenty seconds of the low quality version of the advertisement may be sufficiently transmitted. The system then substantially simultaneously transmits the first ten seconds of the high quality version and the last twenty seconds of the low quality version of the advertisement. Consequently, the system may present the high quality version for the first ten seconds and then switch to the low quality version of the advertisement for the remaining twenty seconds of the advertisement.

In some embodiments, only certain segments of the first and second version of the advertisement may be transmitted. For example, a high quality version of the first segment of an advertisement may begin to be transmitted, while the second segment of the low quality version of the advertisement is transmitted substantially simultaneously. Alternatively, the first segment of the high quality version of the advertisement may be transmitted while the third segment of the low quality version of the advertisement is transmitted. Upon sufficiently transmitting either the first segment of the high quality version of the advertisement or the third segment of the low quality version of the advertisement, a determination of whether to transmit the second segment of the high quality version of the advertisement or the second segment of the low quality version of the advertisement can be made.

FIG. 8B illustrates steps involved determining a point for stopping the version currently being presented and presenting another version. At step 811, the system may analyze the network conditions. For example, the user device 610 (FIG. 6) or the remote server 620 (FIG. 6) may measure the available bandwidth using suitable methods as discussed above. The user device 610 (FIG. 6) or the remote server 620 (FIG. 6) may also consider historical, environmental, geographic or industry information in determining the network conditions.

At step 821, the user device 610 (FIG. 6) or the remote server 620 (FIG. 6) may determine the likely amount of time between the beginning of the transmission of an advertisement and the selection of a media content by the user. The user device 610 (FIG. 6) or the remote server 620 (FIG. 6) may make this determination by any of the factors discussed above. For example, the remote server 620 (FIG. 6) may analyze the user history to determine the typical length of time the user takes to make a selection.

At step 841, the system determines, based on the time determination in step 821, the amount of the first version of an advertisement can be transmitted before the user selection. For example, the system may try to maximize the amount of time that a high quality version of the advertisement is presented. If the high quality version of the advertisement cannot be sufficiently transmitted, the system may replace the portion of the high quality version of the advertisement that was not transmitted with a low quality version of the advertisement.

At step 851, the system assigns a point during the play length of the first version of the advertisement that correlates to a projection of the amount of the first version of the advertisement that may be sufficiently transmitted. For example, the system may project that only half of the first version may be sufficiently transmitted. Therefore, the system will assign the fifteen second mark of the first version of the advertisement as the determined point.

Substantially simultaneously, the system transmits the first version of the advertisement from the beginning of the advertisement to the point determined at step 861 and transmits the second version of the advertisement from the determined point to the end of the advertisement. For example, the remote server 620 (FIG. 6) may transmit the high quality version of the advertisement from the beginning of the advertisement to the fifteen second mark. Substantially simultaneously, the system may transmit the low quality version from the fifteen second mark on.

At step 881, the system receives the user selection of media content. For example, the user may input a selection into the user input 612 (FIG. 6) of the user device 610 (FIG. 6). At step 891, the display 613 (FIG. 6) of the user device 610 (FIG. 6) may present the first version of the advertisement from the beginning of the advertisement to the determined point (e.g., from the beginning until the fifteen second mark). At step 894, the display 613 (FIG. 6) of the user device 610 (FIG. 6) may begin presentation of the second version after the determined point (e.g., from the fifteen second mark until the end).

Figure 8C:
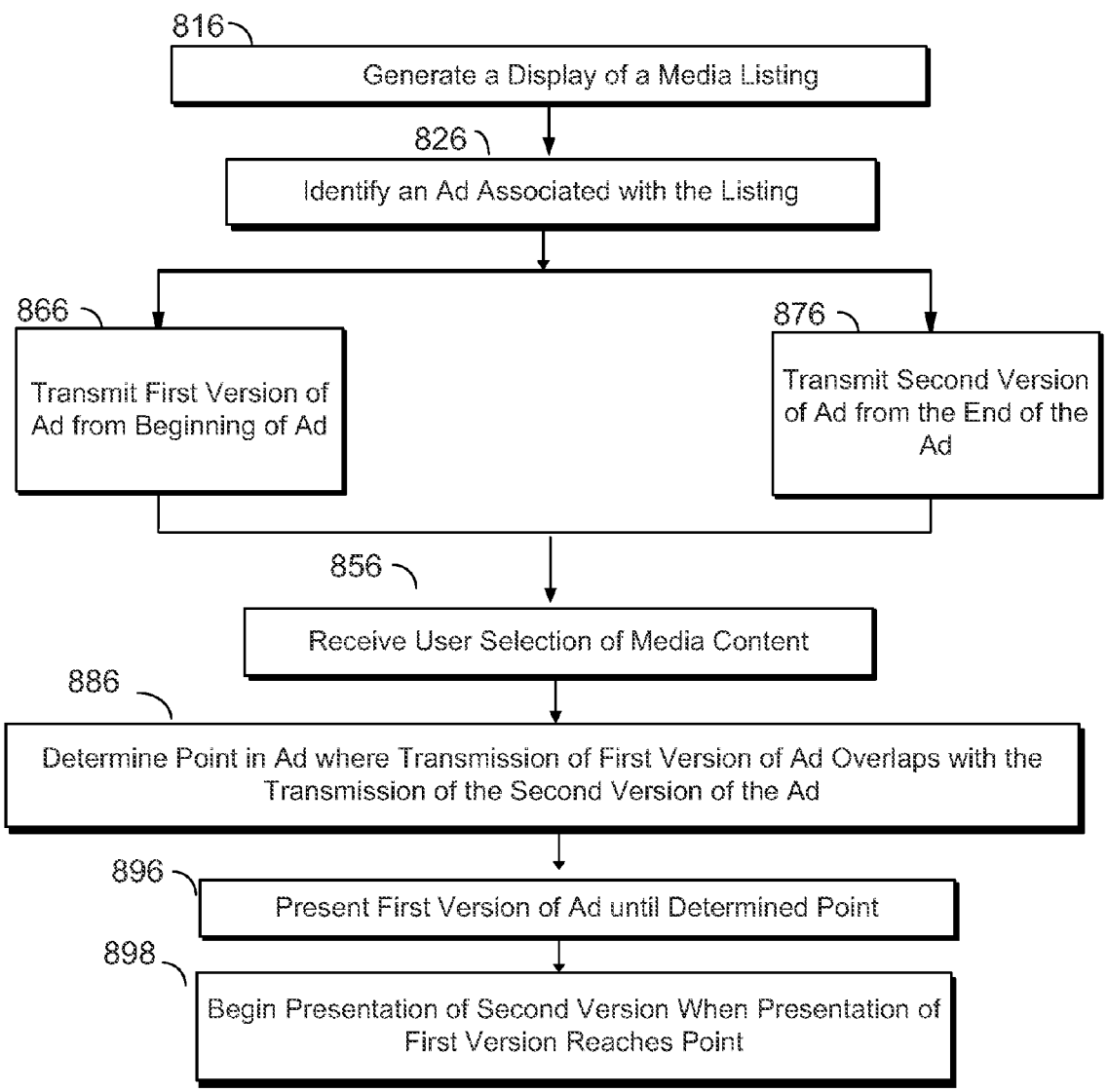
FIG. 8C is a flow-chart of illustrative steps involved in providing advertisement segments in a media system in accordance with some embodiments of the disclosure.

FIG. 8C is a flow-chart of illustrative steps involved in providing advertisements in a media system in accordance with some embodiments of the disclosure, which further includes transmitting segments in reverse. In some embodiments, a version may be transmitted in reverse (e.g., the data related to the end of the segment is transmitted before the data related the beginning of the segment). For example, a high quality version of an advertisement may be transmitted beginning-to-end, while the low quality version of the advertisement is transmitted end-to-beginning, substantially simultaneously.

In some embodiments, step 816 may generate a display of a media listing on the user device 610 (FIG. 6). At step 826, the remote server 620 (FIG. 6) may identify an advertisement associated with the media listing. The remote server 620 (FIG. 6) may identify the advertisement locally or may transmit, receive or retrieve information via the communications network 670 (FIG. 6). The remote server 620 (FIG. 6) may identify the advertisement based on a user profile or a user history, or any of the means discussed above.

Substantially simultaneously, the system transmits the first version of the advertisement from the beginning of the advertisement at step 861 and transmits the second version of the advertisement from the end of the advertisement at step 871. For example, in a thirty second advertisement, the system may transmit the high quality version of the advertisement beginning with second one, then two, and then three. Substantially simultaneously, the system may transmit the low quality version starting with second 30, then second 29, and then second 28.

At step 856, the system receives the user selection of media content. For example, the user may input a selection into the user input 612 (FIG. 6) of the user device 610 (FIG. 6). At step 886, the system determines the point where the transmissions of the two versions of the advertisements overlap. The point may be determined by any of the means described in relation to FIG. 8B or any other embodiment herein. For example, in a thirty second advertisement, if the low quality version transmits twice as fast and the high quality version, the point of overlap may come at the ten second mark of the advertisement's play length.

At step 896, the display 613 (FIG. 6) of the user device 610 (FIG. 6) may present the first version of the advertisement from the beginning of the advertisement to the determined point (e.g., from the beginning until the ten second mark). At step 898, the display 613 (FIG. 6) of the user device 610 (FIG. 6) may begin presentation of the second version after the determined point (e.g., from the ten second mark until the end).

Figure 9:
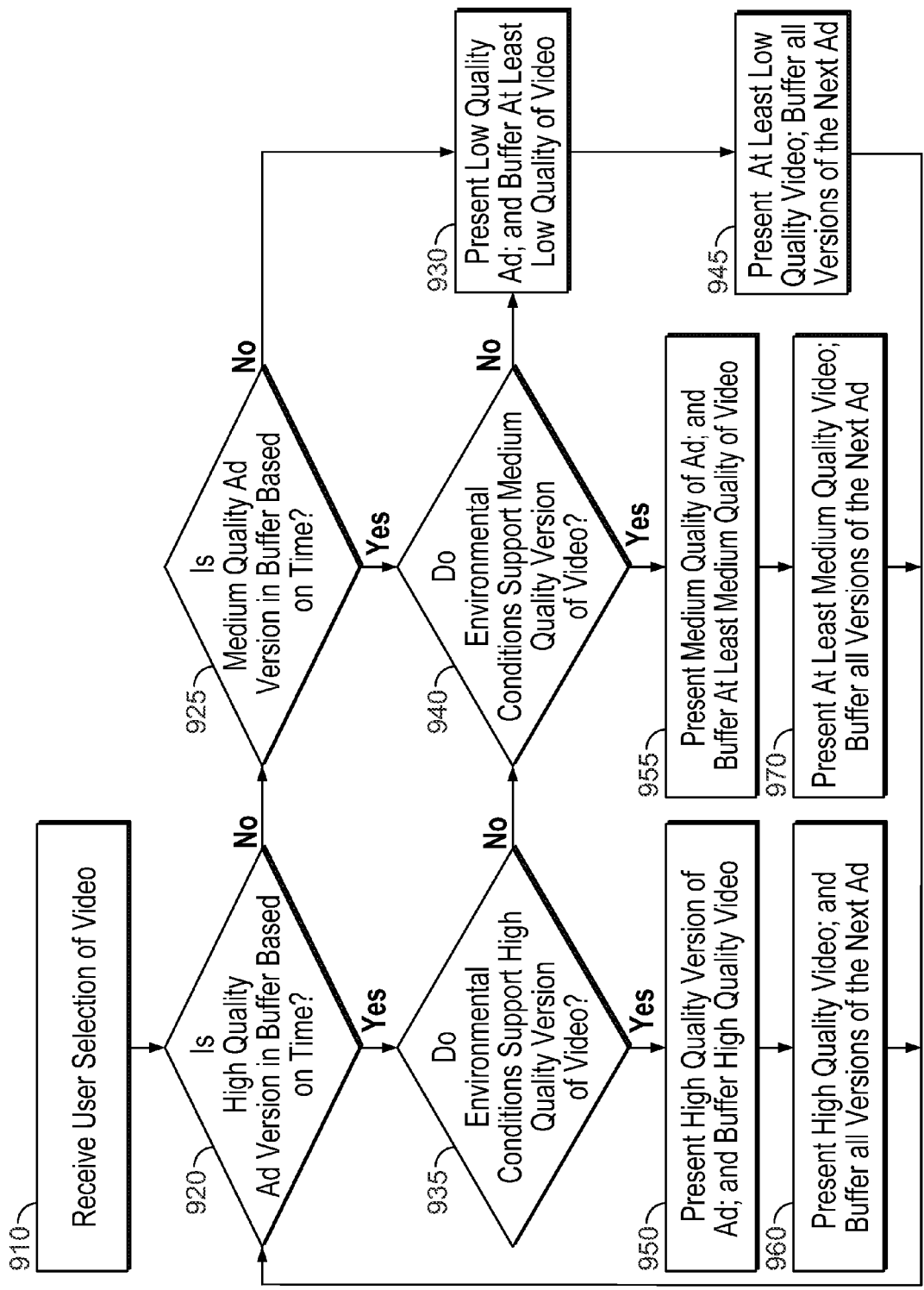
FIG. 9 is a flow-chart of illustrative steps involved in selecting a version of an advertisement in some embodiments of the disclosure.

FIG. 9 is a flow-chart of illustrative steps involved in selecting a version of an advertisement and media content in some embodiments. FIG. 9 includes the option of determining whether environmental conditions should prevent a transmitted advertisement from being presented. It should be noted, any number of versions of an advertisement may be transmitted, and each version may vary by quality, file size or format.

In some embodiments, prior to step 910, three versions are transmitted substantially simultaneously—a high quality version, a medium quality version, and a low quality version. At step 910, the user device 610 (FIG. 6) receives a selection of media content, for example, a video. At step 920, the remote server 620 (FIG. 6) or the user device 610 (FIG. 6) determines whether the high quality version of the advertisement is sufficiently transmitted.

Determining whether a version is sufficiently transmitted may involve measuring a length of time between the transmitting of the versions of the advertisement and the receipt of the user selection. This is particularly important when streaming media content or advertisements. Streaming is the process of making a sequence of data elements available over time.

By allocating the available bandwidth, which is typically measured in bit per second, the remote server 620 (FIG. 6) or the user device 610 (FIG. 6) may determine the length of time required to transmit a file of any given size. Furthermore, the remote server 620 (FIG. 6) or the user device 610 (FIG. 6) may know, based on a user profile or history, the likeliest length of time that a user will take to make a selection. For example, the user profile may contain a history of the user's previous visits to the display of media listings (e.g., web-site, VOD listing page, etc.), and compute the average time the user took to select a media listing. Additionally, other factors such as the particular date, time, number of media listings and content may affect the computation. In addition to computing the average time, the particular algorithm used may base its computation on the mode, median, statistical probabilities, incorporating measures of variability and diversity such as standard deviation, or other suitable methods.

In addition, if an advertisement or media content is presented, the remote server 620 (FIG. 6) or the user device 610 (FIG. 6) may determine the length of the advertisement or media content. If the advertisement or media content can be transmitted faster (i.e. more bits per second) than its play length, also measured in bits per second, the user device 610 (FIG. 6) may temporarily store the advertisement or media content on the memory 616 (FIG. 6) of user device 610 (FIG. 6). Therefore, even if there is a temporary interruption or decrease in the bandwidth, the media content or advertisement can continue to be presented without interruption. Bandwidth allocation is described in greater detail in U.S. patent application Ser. No. 13/207,390 to Craner, U.S. patent application Ser. No. 11/600,936 to Ferrone et al., and U.S. Pat. No. 6,177,931 issued on Jan. 23, 2001 to Alexander et al., which are hereby incorporated by reference in their entirety.

At step 920, if the high quality version of the advertisement is not sufficiently transmitted, the user device 610 (FIG. 6) may determine if the medium quality version of the advertisement is sufficiently transmitted (e.g., in a minimum amount of buffer) at step 925. If not, the user device 610 (FIG. 6) may present the low quality version of the advertisement at step 930. While the user device 610 (FIG. 6) is presenting the low quality version of the advertisement, the user device 610 (FIG. 6) may begin transmitting at least the low quality version of the video the user selected in step 910. In some instances, even the lowest quality version of the advertisement may not be sufficiently transmitted. In such a case, it may be preferable to present the version of the advertisement that may be transmitted the quickest, which may in fact be the low quality version of the advertisement. By minimizing the time to transmit the advertisement, the interruption to the user in also minimized.

At step 920, if the high quality version is in buffer, the user device 610 (FIG. 6) may optionally determine if environmental conditions support a high quality version of the video. Environmental conditions may relate to the past, present, or future bandwidth allocations, may relate to the likelihood of interruptions to the bandwidth both during the transmissions of advertisements and of media content, or may relate to the allocation of the buffer of the memory 616 (FIG. 6) on the user device 610 (FIG. 6), the memory 621 (FIG. 6) on the remote server 620 (FIG. 6), or any device accessible via the communications network 670 (FIG. 6). Environmental conditions may further be affected by time, date or location. For example, at step 935, the environmental conditions may support the transmission of the high quality version of the video the user selected in step 910. In this case, the high quality version of the advertisement may be presented, and the high quality video may begin to be transmitted at step 950.

However, if the environmental conditions do not support the high quality video, a high quality advertisement may make the lower quality video aesthetically unpleasing. Therefore, the user device 610 (FIG. 6) would determine if the environmental conditions supported a medium quality version of the video at step 940. If not, the user device 610 (FIG. 6) may present the low quality version of the advertisement and begin transmitting at least a low quality version of the user selected video of step 910. If the environmental conditions do support the medium quality version of the video at step 940, the medium quality version of the advertisement may be present at step 955. While the medium quality version of the advertisement is presented, at least a medium quality version of the video will begin to be transmitted.

In step 960 the high quality version of the video is presented. While the video is being presented, the user device 610 (FIG. 6) may transmit the various versions of the next advertisement, and the process may be repeated starting at step 920. In step 970, the medium quality version of the video is presented. While the video is being presented the user device 610 (FIG. 6) may transmit the various versions of the next advertisement, and the process may be repeated starting at step 920. In step 945, the low quality version of the video is presented. While the video is being presented, the user device 610 (FIG. 6) may transmit the various versions of the next advertisement, and the process may be repeated starting at step 920.

In some embodiments, the memory 616 (FIG. 6) in the user device 610 (FIG. 6), the memory 621 (FIG. 6) in the remote server 620 (FIG. 6), or any device accessible via the communications network 670 (FIG. 6) may comprise both the buffer for the advertisement content and the media content, and the total amount of buffer may be limited. Therefore, in some embodiments, the allocation of bandwidth as discussed below in FIG. 10 and throughout this disclosure may additionally weigh the amount of available buffer space when allocating the bandwidth to advertisement content and media content, or particular versions of either. For example, a certain amount of buffer in the memory 616 (FIG. 6) in the user device 610 (FIG. 6) may be reserved for advertisement content or may be reserved for media content.

In addition, the rate at which the buffer fills and empties may also be used to allocate the available bandwidth as discussed below in FIG. 10 and throughout this disclosure. For example, the buffer may fill at a high rate while an advertisement is transmitted at a high rate. The buffer may alternatively fill at a low rate while an advertisement is transmitted at a low rate. The buffer may also empty at a particular rate. The emptying rate may be the bit rate of a particular version as the particular version is played (e.g., a high quality version may empty the buffer at a higher rate than a low quality advertisement). As changes in bandwidth and allocation occur, the buffer may fill and empty at different rates. Therefore, the memory 616 (FIG. 6) in the user device 610 (FIG. 6), the memory 621 (FIG. 6) in the remote server 620 (FIG. 6), or any device accessible via the communications network 670 (FIG. 6) may determine a need to adjust the bandwidth allocation of particular versions of advertisements or media content.

For example, a high quality media content may have been sufficiently transmitted and is currently being buffered on the memory 616 (FIG. 6) in the user device 610 (FIG. 6). The high quality media content may not be playing yet (e.g., the pre-roll advertisement may still be playing), but the memory 616 (FIG. 6) in the user device 610 (FIG. 6) may begin to buffer the next advertisement (i.e. the advertisement due to play subsequent to the high quality media currently in the buffer). Because the buffer is not yet emptying the high quality media content, the buffer may be reaching its capacity. Therefore, the user device 610 (FIG. 6) may begin transmitting the low quality version of the next advertisement (as it may require less buffer space) even though the bandwidth needed for the higher quality version is available.

Furthermore, using the filling and emptying rate of the buffer, in addition to the play length of the advertisement or media content (e.g., to determine when the buffer will empty), the system may determine a point in the advertisement or media content (or alternatively the amount of data of either) that the system has the capacity to buffer. Using these calculations, the system can optimize the particular attributes (e.g., the amount of a high quality version of the media content that can be shown).

Figure 10:
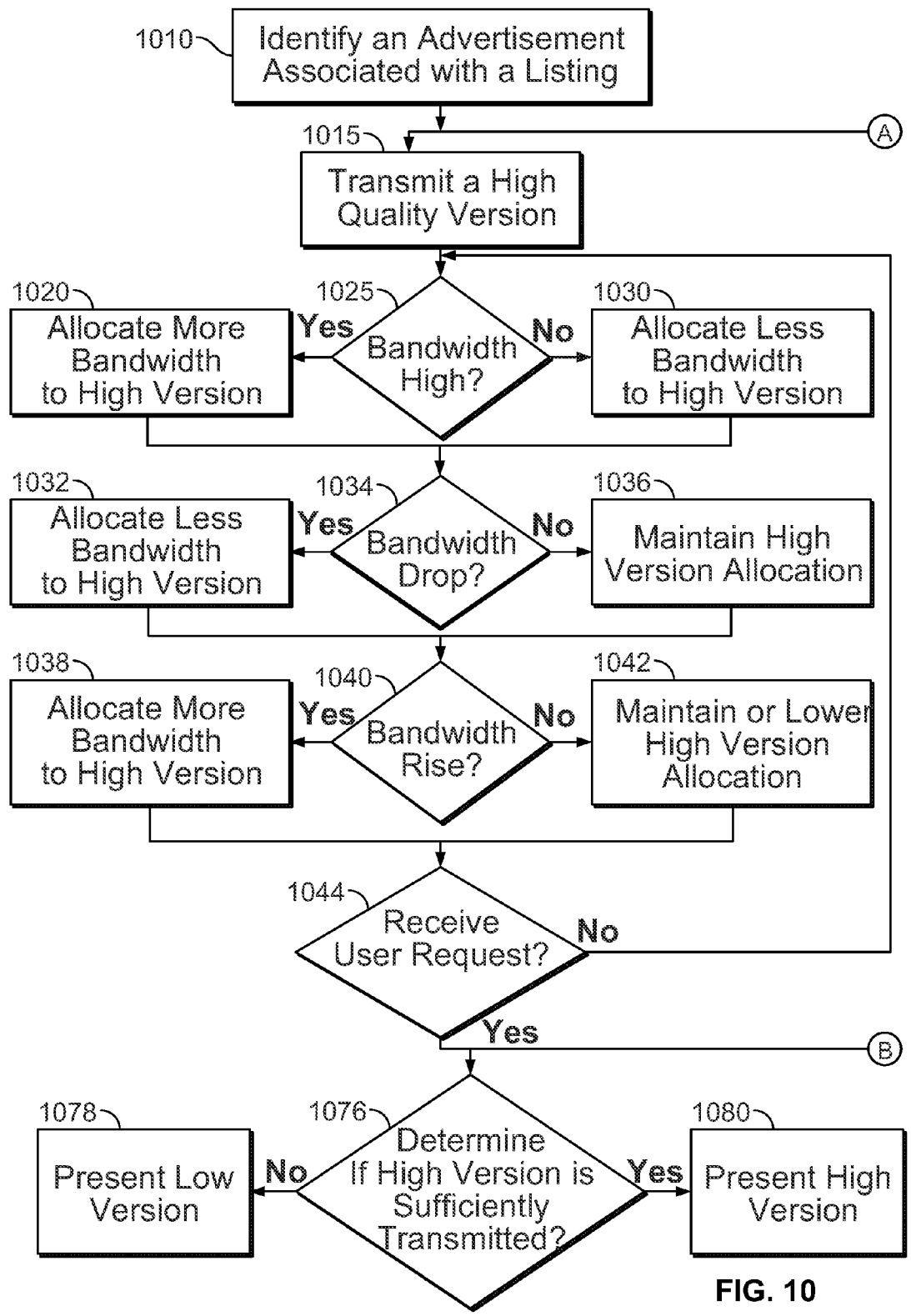
FIG. 10 is a flow-chart of illustrative steps involved in allocating bandwidth in some embodiments of the disclosure.
Figure 10:
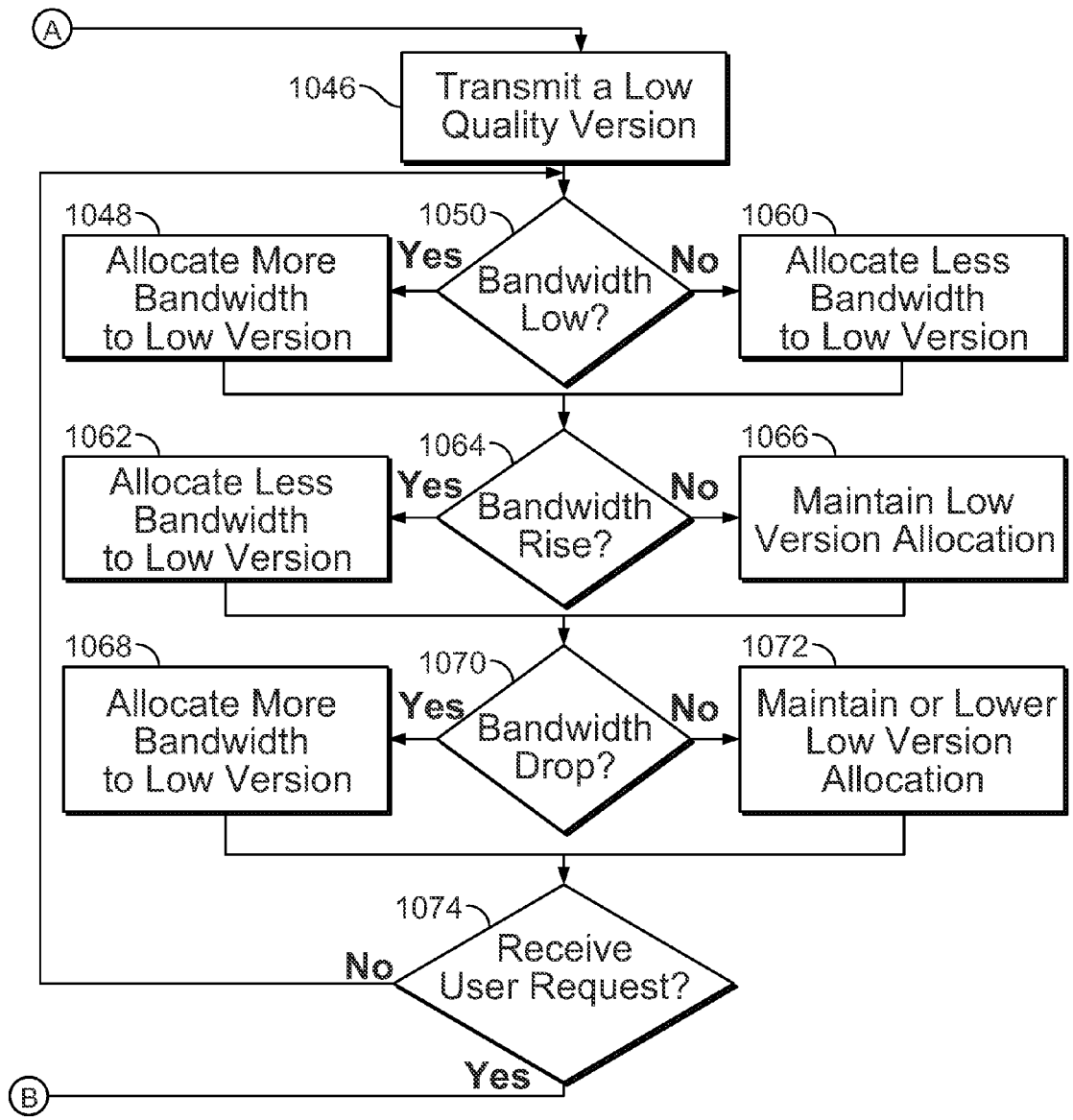

FIG. 10 is a flow-chart of illustrative steps involved in allocating bandwidth in some embodiments of the disclosure. In addition to providing multiple versions of an advertisement substantially simultaneously, in some embodiments the system may allocate the available bandwidth to prioritize or prefer a particular version. This is helpful in maximizing the likelihood that a user will be able to view the preferred version, while ensuring that at least one version of the advertisement will be sufficiently transmitted. The allocation can occur in real-time (e.g., during transmission) and the bandwidth may be continuously monitored.

In some embodiments, the remote server 620 (FIG. 6) or the user device 610 (FIG. 6) has identified an advertisement associated with a listing at step 1010. Substantially simultaneously, the remote server 620 (FIG. 6) or any device connected via the communications network 670 (FIG. 6) transmits, or the user device 610 (FIG. 6) receives, a high quality version of an advertisement in step 1015 and a low quality advertisement in step 1046. In some embodiments, three or more versions may be substantially simultaneously transmitted. Only two versions were used in FIG. 10 in order to not overcomplicate the figure.

At step 1025, the remote server 620 (FIG. 6), any device accessible via the communications network 670 (FIG. 6), or the user device 610 (FIG. 6) makes an initial bandwidth determination relative to the data that needs to be transmitted. This initial determination as well as subsequent determinations may include numerous factors. For example, environmental conditions such as the current bandwidth and the likelihood of interruptions to the bandwidth may be compared with the likelihood that a given quality version may be sufficiently transmitted in a given time period. The time period may be based on the time until a user selection or the length of a currently playing advertisement or media content. Additionally, there may be user preferences that prefer higher quality advertisements and media content. In this case, the user may be less likely to abandon the view, if there is a delay in the start of the advertisement or media content.

In some embodiments, step 1025 determines if the bandwidth is high or sufficient relative to the amount of data that must be transmitted in the advertisement in the given period of time. If the bandwidth is high, the likelihood that the high quality version will ultimately be displayed is also high. Therefore, the remote server 620 (FIG. 6), any device accessible via the communications network 670 (FIG. 6), or the user device 610 (FIG. 6) may allocate more bandwidth to the high quality version of the advertisement at step 1020. In contrast, if the bandwidth is low, the likelihood that the high quality version will ultimately be displayed is also low. Therefore, the remote server 620 (FIG. 6) or the user device 610 (FIG. 6) may allocate less bandwidth to the high quality version of the advertisement at step 1020.

The remote server 620 (FIG. 6) or the user device 610 (FIG. 6) may periodically or continually monitor for bandwidth changes and adjust the allocation as necessary. Alternatively, the remote server 620 (FIG. 6) or the user device 610 (FIG. 6) may adjust the allocation any time there is a change in bandwidth, user profile or environmental factors.

At step 1034, the remote server 620 (FIG. 6) or the user device 610 (FIG. 6) may determine whether the bandwidth has decreased. If the bandwidth has decreased, the likelihood that the high quality version will ultimately be displayed is lowered. Therefore, the remote server 620 (FIG. 6) or the user device 610 (FIG. 6) may allocate less bandwidth to the high quality version of the advertisement at step 1032. In contrast, if the bandwidth has not decreased, the likelihood that the high quality version will ultimately be displayed is higher or at least not lower. Therefore, the remote server 620 (FIG. 6) or the user device 610 (FIG. 6) may maintain or increase the bandwidth to the high quality version of the advertisement at step 1036.

The remote server 620 (FIG. 6) or the user device 610 (FIG. 6) continues to periodically or continually monitor for bandwidth changes and adjust the allocation as necessary. At step 1040, the remote server 620 (FIG. 6) or the user device 610 (FIG. 6) determines whether or not the bandwidth has risen. If the bandwidth has risen, the likelihood that the high quality version will ultimately be displayed is higher. Therefore, the remote server 620 (FIG. 6) or the user device 610 (FIG. 6) may allocate more bandwidth to the high quality version of the advertisement at step 1038. In contrast, if the bandwidth has not risen, the likelihood that the high quality version will ultimately be displayed is lower or at least not higher. Therefore, the remote server 620 (FIG. 6) or the user device 610 (FIG. 6) may lower or maintain the bandwidth allocated to the high quality version of the advertisement at step 1042.

The progress of the transmission may further augment the selection process. For example, if the remote server 620 (FIG. 6) or the user device 610 (FIG. 6) determines that the high quality version is almost completely transmitted, then an increase (or at least not a decrease) in bandwidth is a better predictor that the transmission will be completed than if the increase is determined near the beginning of the transmission. If the increase is determined near the beginning of the transmission, then there is a greater likelihood (i.e. more time for a subsequent lowering of the bandwidth or a complete interruption) that the transmission is not completed. Therefore, the remote server 620 (FIG. 6) or the user device 610 (FIG. 6) may maintain or increase the bandwidth to the high quality version of the advertisement at step 1042.

At step 1044, the remote server 620 (FIG. 6) or the user device 610 (FIG. 6) may receive a user selection. This could occur through an input by the user into the user input interface 612 (FIG. 6) on the user device 610 or automatically based on an amount of lapsed time, user history or profile, or instructions from the remote server 620 (FIG. 6). If there is not a user selection at step 1044, then the remote server 620 (FIG. 6) or the user device 610 (FIG. 6) may proceed through another iteration beginning at step 1025. In this case, a determination can once again be made based on the amount of available bandwidth relative to the data that needs to be transmitted. As the amount of available bandwidth is measured relative to the amount of data that needs to be transmitted, the determinations may be augmented during multiple iterations. For example, if the high quality version of the advertisement has already been sufficiently transmitted, the determination steps 1025, 1034 and 1040 may augment the algorithm or criteria to transmit the low quality version of the advertisement.

At step 1046, the remote server 620 (FIG. 6) or the user device 610 (FIG. 6) makes an initial bandwidth determination for the low quality version of the advertisement. This initial determination as well as subsequent determinations may include numerous factors. For example, environmental conditions such as the current bandwidth and the likelihood (based on industry, geographic or user history) of interruptions to the bandwidth may be compared with the likelihood that a given quality version may be sufficiently transmitted in a given time period. The time period may be based on the time until a user selection or the length of a currently playing advertisement or media content.

In some embodiments, step 1050 determines if the bandwidth is low or sufficient relative to the amount of data that must be transmitted in the advertisement in the given period of time. If the bandwidth is low, the likelihood that the low quality version will ultimately be displayed is higher as it may be more difficult to sufficiently transmit the high quality version of the advertisement. Therefore, the remote server 620 (FIG. 6) or the user device 610 (FIG. 6) may allocate more bandwidth to the low quality version of the advertisement at step 1048. In contrast, if the bandwidth is high, the likelihood that the high quality version will ultimately be displayed is also higher. Therefore, the remote server 620 (FIG. 6) or the user device 610 (FIG. 6) may allocate less bandwidth to the low quality version of the advertisement at step 1020.

The remote server 620 (FIG. 6) or the user device 610 (FIG. 6) may periodically or continually monitor for bandwidth changes and adjust the allocation as necessary. Alternatively, the remote server 620 (FIG. 6) or the user device 610 (FIG. 6) may adjust the allocation any time there is a change in bandwidth, user profile or environmental factors.

At step 1064, the remote server 620 (FIG. 6) or the user device 610 (FIG. 6) may determine whether the bandwidth has increased. If the bandwidth has increased, the likelihood that the low quality version will ultimately be displayed is lowered. Therefore, the remote server 620 (FIG. 6) or the user device 610 (FIG. 6) may allocate less bandwidth to the low quality version of the advertisement at step 1062. In contrast, if the bandwidth has not increased, the likelihood that the low quality version will ultimately be displayed is higher or at least not lower. Therefore, the remote server 620 (FIG. 6) or the user device 610 (FIG. 6) may maintain or increase the bandwidth to the low quality version of the advertisement at step 1066.

As the remote server 620 (FIG. 6) or the user device 610 (FIG. 6) continues to monitor for bandwidth changes and adjust the allocation as necessary, the remote server 620 (FIG. 6) or the user device 610 (FIG. 6) determines whether or not the bandwidth has decreased at step 1070. If the bandwidth has decreased, the likelihood that the low quality version will ultimately be displayed is higher. Therefore, the remote server 620 (FIG. 6) or the user device 610 (FIG. 6) may allocate more bandwidth to the low quality version of the advertisement at step 1068.

In contrast, if the bandwidth has not decreased, the likelihood that the low quality version will ultimately be displayed is lower or at least not higher. Therefore, the remote server 620 (FIG. 6) or the user device 610 (FIG. 6) may maintain or lower the bandwidth to the low quality version of the advertisement at step 1072. The progress of the transmission may further augment the selection process as explained above.

At step 1074, the remote server 620 (FIG. 6) or the user device 610 (FIG. 6) may receive a user selection. If there is not a user selection at step 1074, then the remote server 620 (FIG. 6) or the user device 610 (FIG. 6) may proceed through another iteration beginning at step 1050. In this case, a determination can once again be made based on the amount of available bandwidth relative to the data that needs to be transmitted. As the amount of available bandwidth is measured relative to the amount of data that needs to be transmitted, the determinations, or underlying algorithms, may be augmented during multiple iterations. For example, if the low quality version of the advertisement has already been sufficiently transmitted, the determination steps 1050, 1064 and 1070 may be augmented to transmit other versions of the advertisement, versions of media content, or any other data.

If a user request is received at step 1044 or step 1074, the remote server 620 (FIG. 6) or the user device 610 (FIG. 6) may determine to present a particular version of the advertisement at step 1076. If the high quality version of the advertisement is sufficiently transmitted, the high quality version may be presented on the display 613 (FIG. 6) of the user device 610 (FIG. 6) in step 1080.

In contrast, if the high quality version is not sufficiently transmitted, the user device 610 (FIG. 6) may present the low quality version of the advertisement on the display 613 (FIG. 6) of the user device 610 (FIG. 6). It should be understood that steps 1025, 1034, 1040, 1050, 1064 and 1070 of FIG. 10 may be executed or performed in any order or sequence and not limited to the order and sequence shown and described. Also, some of the above steps may be executed or performed substantially simultaneously where appropriate or in parallel to reduce latency and processing times.

Figure 11A:
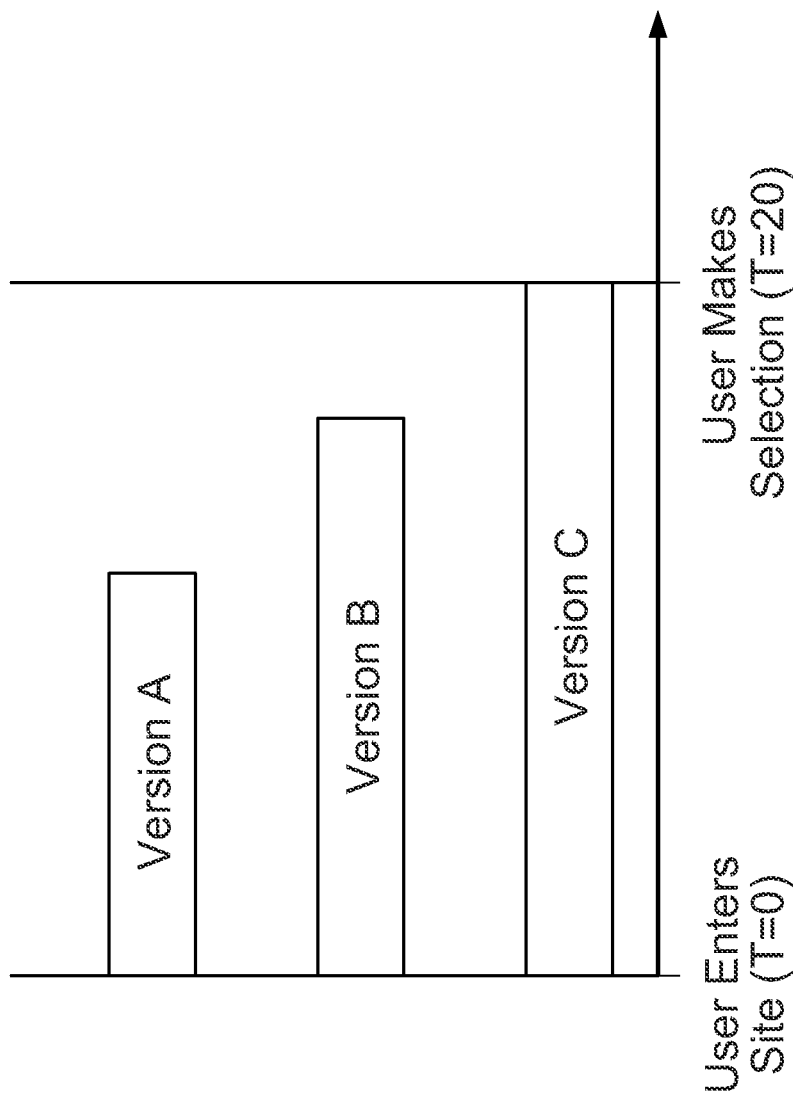
FIG. 11A is a graph relating to selecting a version of an advertisement in some embodiments of the disclosure.

FIG. 11A-F are illustrative examples of some embodiments. In FIG. 11A, three versions of an advertisement are transmitted when a user enters a web-site, which contains media listings (Time=0). In some embodiments, the three versions may instead begin being transmitted after a specified duration of time determined by the remote server 620 (FIG. 6) or the user device 610 (FIG. 6). By the time the user makes a selection (Time=20), only Version C has been sufficiently transmitted. In this case, Version C may be the version of the advertisement that is presented to the user.

Figure 11B:
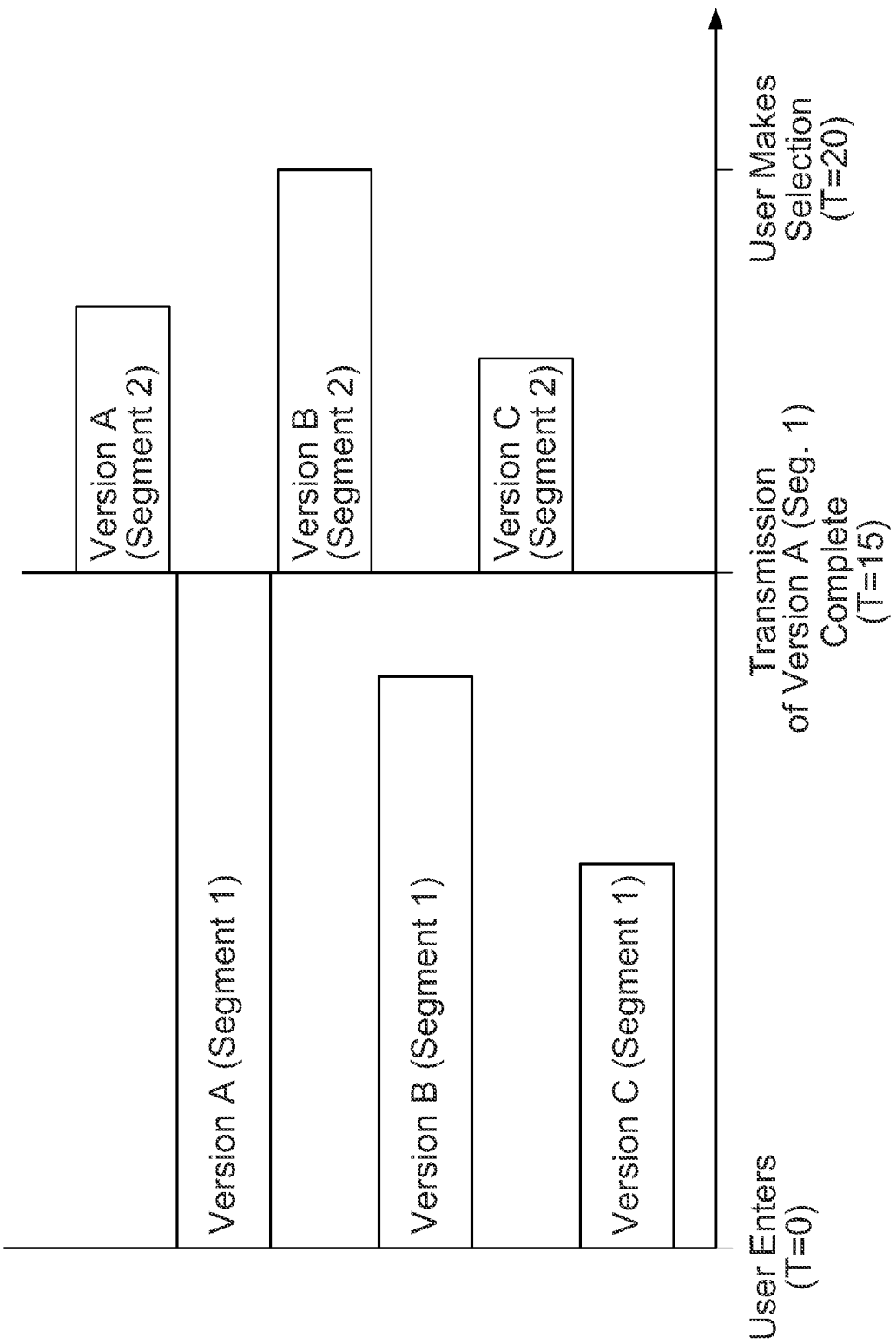
FIG. 11B is a graph relating to selecting a version of an advertisement in some embodiments of the disclosure.

In FIG. 11B, the advertisement has been further divided into segments as described above and shown in FIG. 8. Three versions of the advertisement segment are transmitted when a user enters a web-site (Time=0). After fifteen seconds, Version A is sufficiently transmitted. The remote server 620 (FIG. 6) or the user device 610 (FIG. 6) may determine whether to begin transmission of the three versions of the second segment of the advertisement or to complete the transmission of any remaining versions of the first segment of the advertisement. In some embodiments, the transmission of the remaining versions of the first segment of the advertisement may be finished and displayed to the user in order to maintain a consistent quality throughout the segments.

The remote server 620 (FIG. 6) or the user device 610 (FIG. 6) may further adjust the allocation of bandwidth to any of the versions of either segment as described and shown in FIG. 10. The remote server 620 (FIG. 6) or the user device 610 (FIG. 6) may determine that subsequent segments of the advertisement may not require the quality of the first segment as a user may not notice a drop in quality as the advertisement is presented. When the user makes a selection (T=20), Version B of the second segment is sufficiently transmitted, and may be the version presented to the user.

Figure 11C:
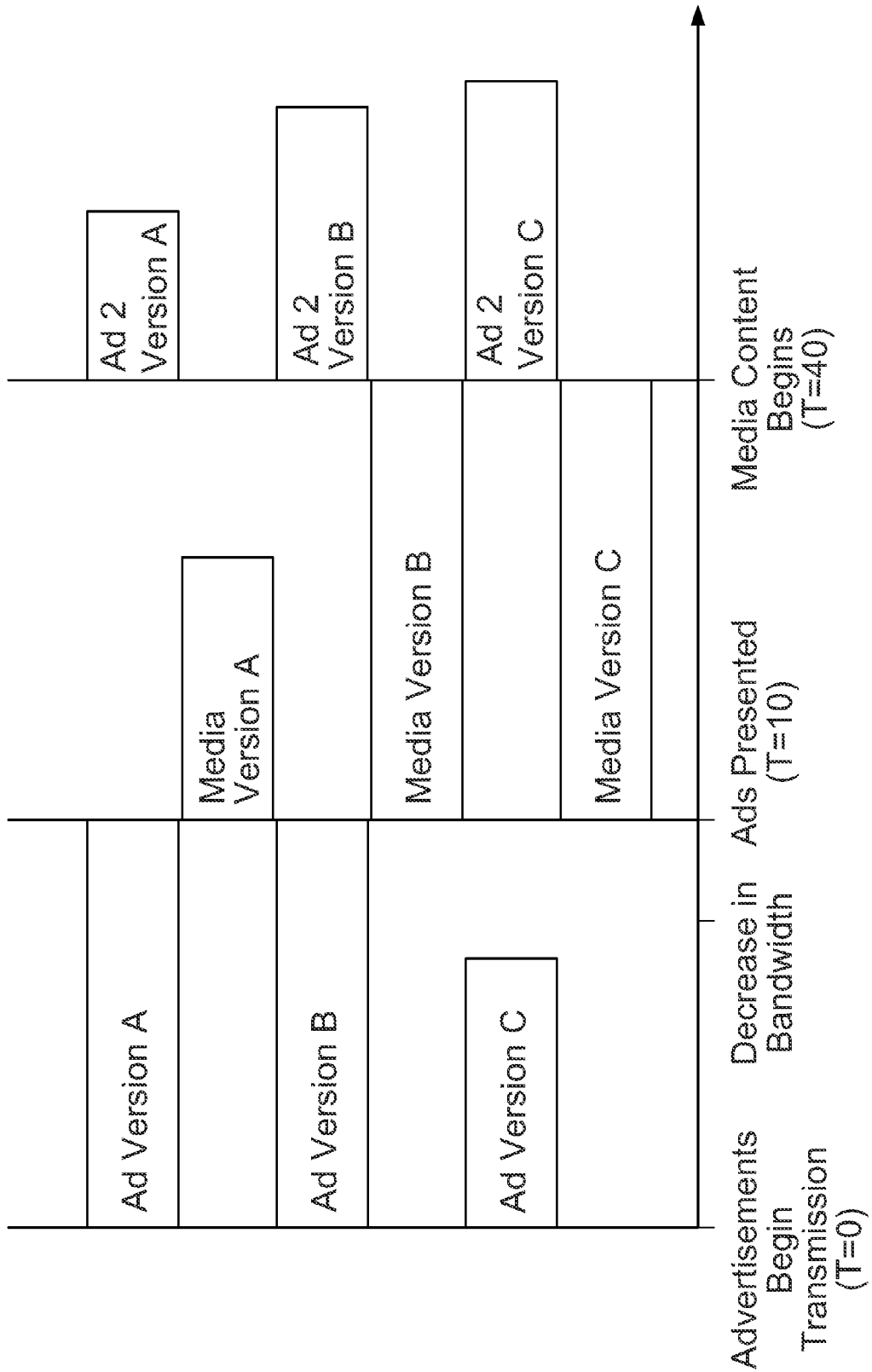
FIG. 11C is a graph relating to selecting a version of an advertisement in some embodiments of the disclosure.

In FIG. 11C, three versions of an advertisement are transmitted when a user enters a website (Time=0). Ten seconds later, the user makes a selection (Time=10). Advertisement Version A and advertisement Version B are both sufficiently transmitted. Advertisement version A may have a higher quality than advertisement Version B, so advertisement version A may be the version that is presented to the user. Alternatively, the remote server 620 (FIG. 6) or the user device 610 (FIG. 6) may have determined that the available bandwidth has suddenly decreased (Time=9). Therefore, the remote server 620 (FIG. 6) or the user device 610 (FIG. 6) may determine that it is unlikely that media listing Version A, which has the same quality as advertisement Version A, will be sufficiently transmitted following the thirty second presentation of advertisement Version A. Therefore, the remote server 620 (FIG. 6) or the user device 610 (FIG. 6) may determine that advertisement Version B should be presented.

When the user selects a media listing (Time=10), advertisement Version B is presented to the user on the user device 610 (FIG. 6). When advertisement B is presented, three versions, Media Version A, Media Version B and Media Version C, of the user selected media content begin being transmitted. While advertisement version B is presented, the three media versions are transmitted. At the conclusion of the presentation of Advertisement Version B, Media Version B and Media Version C have been sufficiently transmitted; however, Media Version A has not been sufficiently transmitted. The remote server 620 (FIG. 6) or the user device 610 (FIG. 6) may then determine whether to present Media Version B or Media Version C, weighing profile information, environmental factors, and aesthetics.

The remote server 620 (FIG. 6) or the user device 610 (FIG. 6) then decides to present either media version B or media version C (Time=40). While either Media Version B or Media Version C is being presented, a second advertisement may be selected for presentation. At conclusion of Advertisement Version B (Time=40), the remote server 620 (FIG. 6) or the user device 610 (FIG. 6) may begin transmitting several versions of a second advertisement. A version of the second advertisement may be presented following a segment, or several segments, of the selected media version or versions. The placement of the version of the second advertisement may be determined by the advertisement scheduler 664 (FIG. 6). Similarly, subsequent segments of the media content may be determined by the content scheduler 644.

Figure 11D:
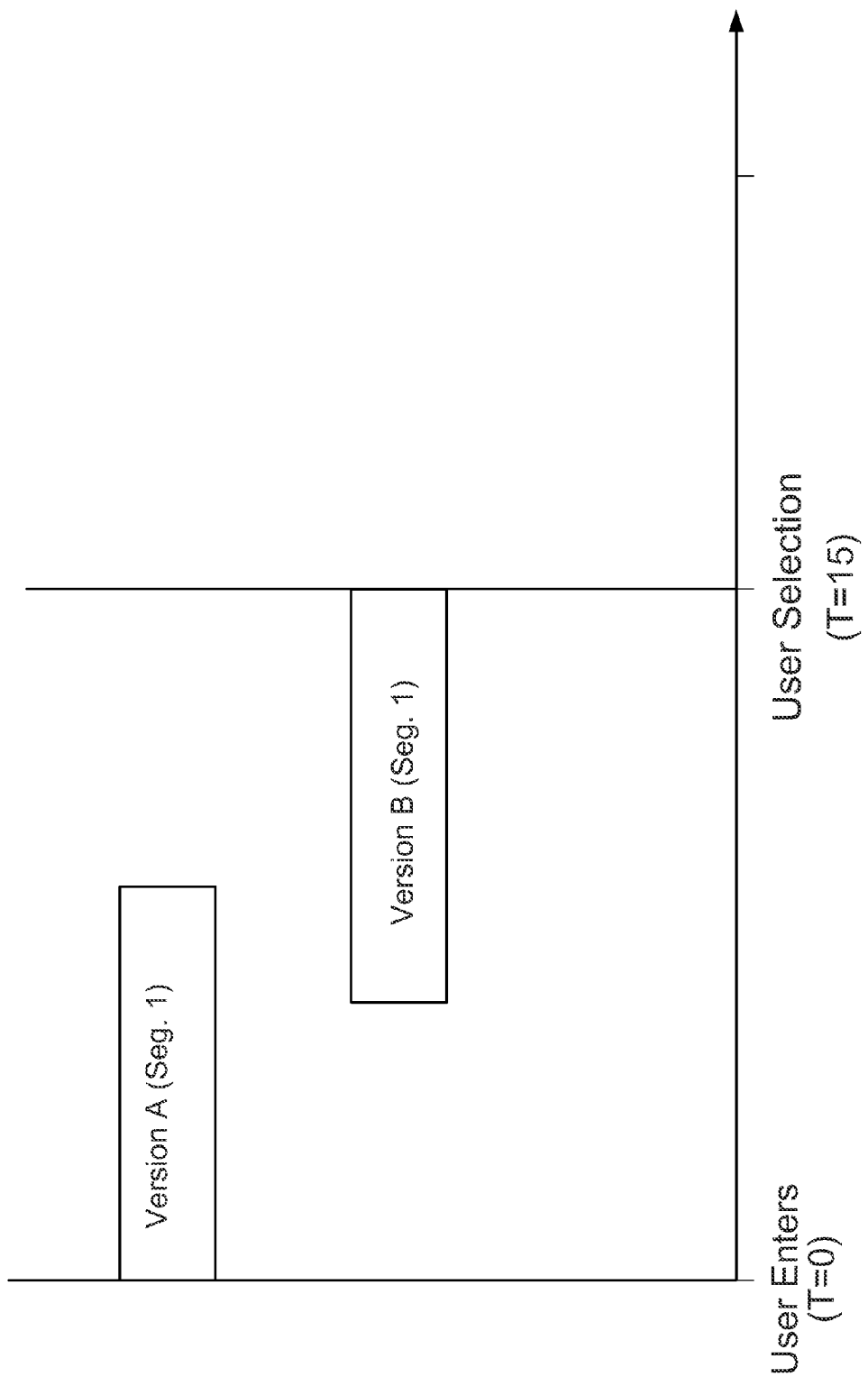
FIG. 11D is a graph relating to selecting a version of an advertisement in some embodiments of the disclosure.

FIG. 11D shows two versions of an advertisement segment that are being transmitted substantially simultaneously, where one version is transmitted in reverse. In FIG. 11D, the data related to the end of the first segment of Version B is transmitted before the data related to the beginning of the first segment of Version B. For example, Version A may be a high quality version of an advertisement and may be transmitted beginning-to-end. Substantially simultaneously, Version B, the low quality version of the advertisement, is transmitted end-to-beginning. Furthermore, the presentation of Version A may stop at some point and Version B may begin presentation at that point as discussed in relation to FIG. 8B.

Figure 11E:
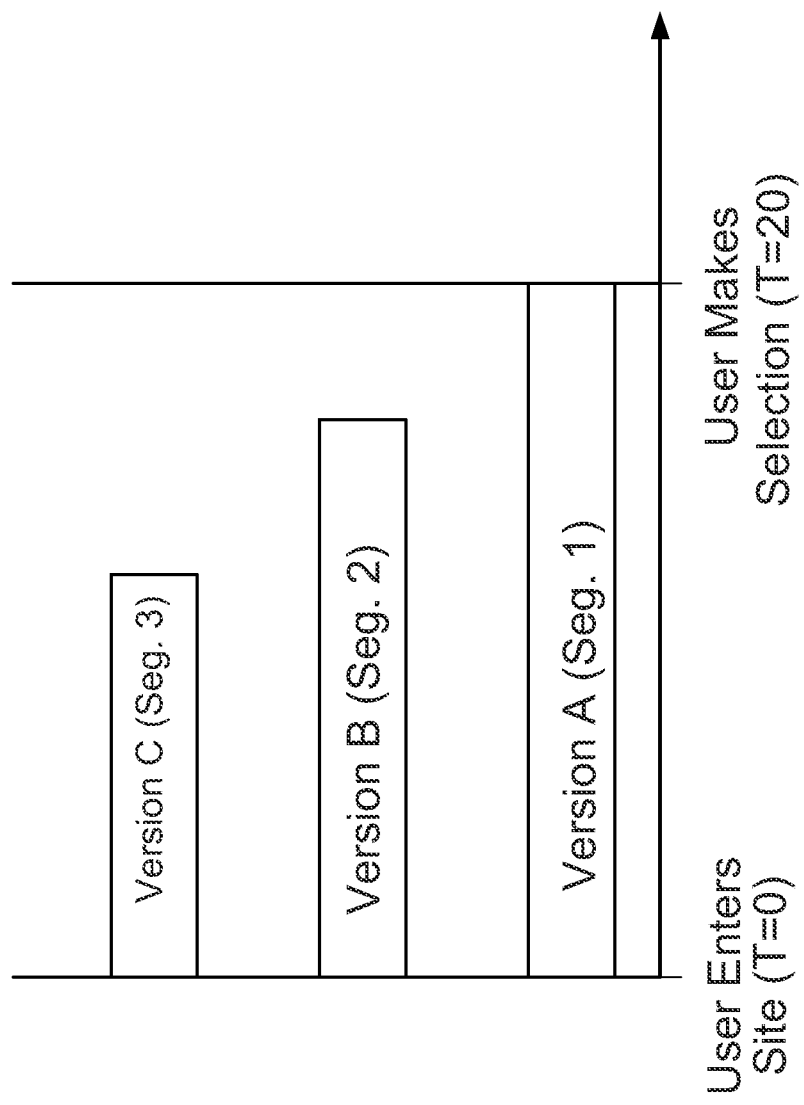
FIG. 11E is a graph relating to selecting a version of an advertisement in some embodiments of the disclosure.

FIG. 11E shows three different versions of three different advertisement segments being transmitted substantially simultaneous. In FIG. 11E Version A, Version B and Version C relate to a first segment, a second segment, and a third segment, respectively. While these segments may be transmitted substantially simultaneously, the segments may be presented in series. For example, a high quality version may be transmitted for an initial segment. The system may know that the high quality version of the first segment of the advertisement is likely to be sufficiently transmitted by the time the user makes a selection (T=20). Therefore, the system transmits subsequent advertisement segments as well as the initial advertisement segment beginning when the user accesses the media listing (T=0). It should be noted that the subsequent segments may be of a same or different quality.

Figure 11F:
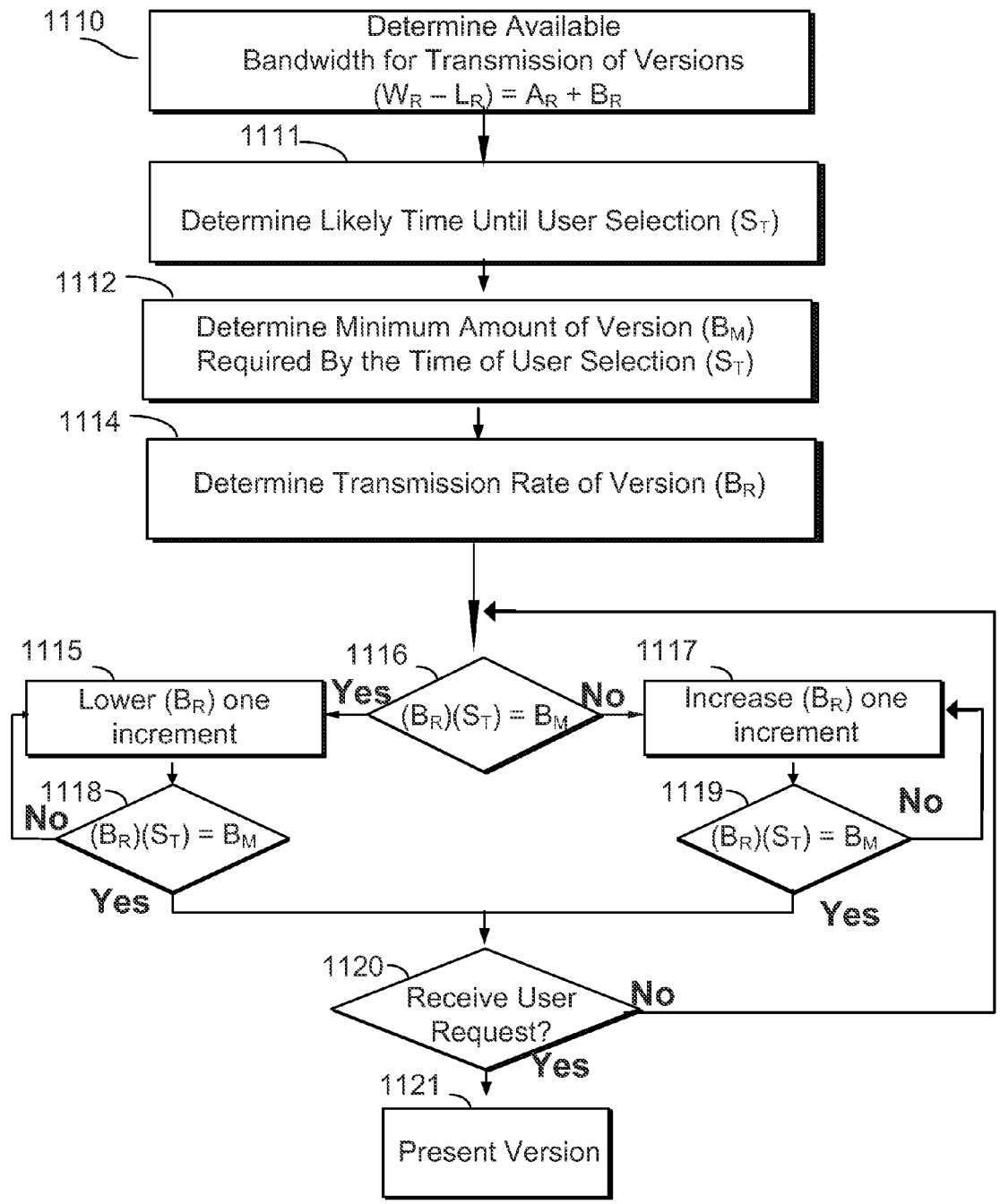
FIG. 11F is a flow-chart of illustrative steps involved in measuring bandwidth in some embodiments of the disclosure.

FIG. 11F is a flow-chart of illustrative steps involved in measuring and allocating bandwidth in some embodiments of the disclosure. At step 1110, the amount of available bandwidth is determined. For example, the available bandwidth ($W_R$) may be described in megabits per second. The available bandwidth may need to equal to the sum of the bandwidth allocated to a high quality version of the advertisement ($A_R$), the low quality version ($B_R$) and any lost bandwidth ($L_R$), each of these variables also measured in megabits per second. Lost bandwidth may refer to bandwidth used for any other purpose other than the transmission of the advertisement version, for example, due to other media transmissions, packet loss, noise, etc. Therefore, $A_R+B_R+L_R=W_R$ may represent the total allocation of the bandwidth.

At step 1111, the system may determine the likely time until a user selects a media listing ($S_T$). This determination may use any suitable statistical method and be based on the user profile or history, in addition to other methods described herein. At step 1112, the minimum amount of transferred data required for a version of the advertisement to be sufficiently transmitted may be determined.

For example, for the low quality version, $(B_R)(S_T)=B_M$, where $S_T$ is the estimated time (in seconds) a user will select a media listing, and $B_M$ is the minimal amount of data for the low quality version to be sufficiently transmitted. The total amount of data for the complete presentation of the low quality version will be $B_P$, where $B_P=B_M+(B_R)(S_{(A-T)})$, and where $S_A$ is the time before transmitted data will be presented. For example, even if the low quality version is sufficiently transmitted, some data may still need to be transmitted for the low quality version (e.g., the advertisement may need buffer while it is playing). However, the play length associated with the data already transmitted for low quality version will provide the low quality version additional time to transmit untransmitted portions (e.g., while the first portion of the advertisement is presented, the next portion may be transmitted).

At step 1114, the system (e.g., the user device 610 (FIG. 6), the remote server 620 (FIG. 6) or any device accessible via the communications network 670 (FIG. 6)) may determine the transmission rate (BR) of the low quality version using any suitable methods. The remaining bandwidth will equal the bandwidth allocated to the high quality version (e.g., $A_R=W_R-B_R-L_R$). At step 1116, the system may determine if $(B_R)(S_T)=B_M$. If it does, the system may try to lower $(B_R)$ one increment at step 1115. An increment may be the smallest amount by which the rate of the transmission (either increase or decrease). The system may continue to test $B_M$ at step 1118 until $(B_R)(S_T)$ does equal $B_M$. Lowering $(B_R)$ by one increment could aid in transmitting another version of the advertisement. For example, while the system aims to ensure that at least the low quality version of the advertisement will be sufficiently transmitted, the system may prefer to have the high quality version sufficiently transmitted.

If $B_M$ does not equal $(B_R)(S_T)$, the system may increase $(B_R)$ by one increment at step 1117. The system may continue to test $B_M$ at step 1119 until $(B_R)(S_T)$ does equal $B_M$. By using single increments, the system may once again reserve available bandwidth for other versions of the advertisement. At step 1120, the system may determine if it has received a user selection. If the system has, a version may be presented at step 1121, if it has not the system may engage in another iteration of the system beginning at step 1116. A subsequent iteration may further adjust the rate of transmission for any version of the advertisement as the bandwidth requirements to sufficiently transmit any particular version may change, due to network conditions or other versions completing their transmission.

The preceding method is but one example of a method that may be used in the system for measuring and allocating bandwidth. Other suitable methods may also be applied. Furthermore, the steps described in FIG. 11F may be done in any order or in parallel to reduce lag and improve efficiencies. The remote server 620 (FIG. 6), user device 610 (FIG. 6), or any device accessible via the communications network 670 (FIG. 6) may perform any step of this or any other method.

Figure 12:
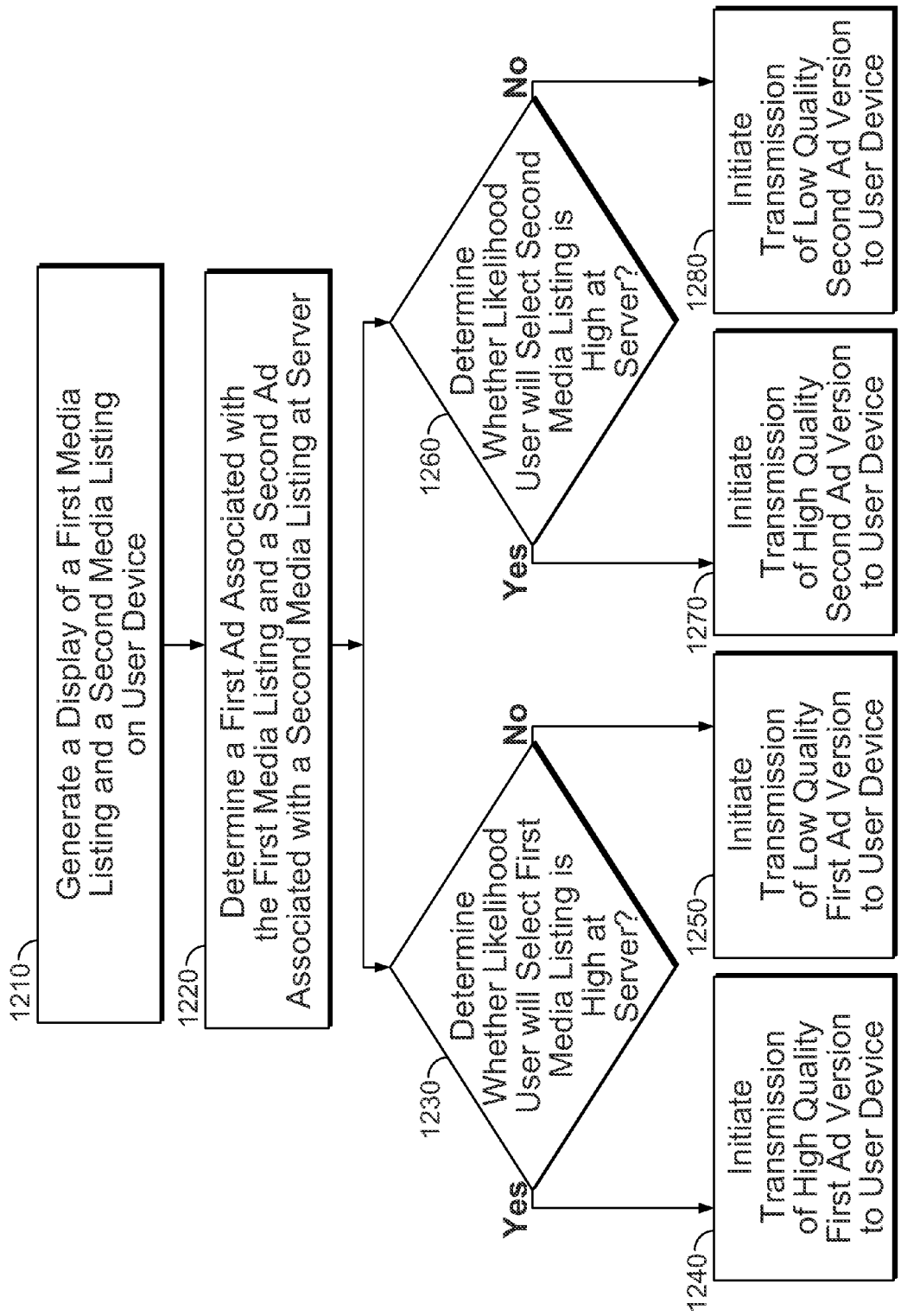
FIG. 12 is a flow-chart of illustrative steps involved in selecting a version of multiple advertisements to associate with respective media listings.

FIG. 12 is a flow-chart of illustrative steps involved in selecting a version of an advertisement for multiple media listings. In some embodiments, different media listings may be associated with different advertisements. For example, sports programming media listing may be associated with an advertisement for athletic equipment, whereas a cooking show media listing may be associated with an advertisement for kitchen appliances. A user profile stored on memory 616 (FIG. 6) on the user device 610 (FIG. 6), and received by the remote server 620 (FIG. 6) or any device accessible via the communications network 670 (FIG. 6) may indicate that the user is more likely to view the sports programming media listing. It may be desirable to provide the user with high quality versions of any advertisement with minimized delay; however, because of bandwidth constraints, it may be difficult to achieve. Accordingly, the system can allocate its transmission bandwidth resources based on what the user is likely to select, but still be able to provide a low quality alternative with minimized delay, if the user makes a less likely selection. Therefore, the advertisement for the athletic equipment may be transmitted in high quality and the advertisement for kitchen appliances will be transmitted in low quality. When the user selects either the sports programming media or the cooking show media, the respective advertisement will be presented to the user.

In some embodiments, each media may be associated with multiple advertisements. The advertisements may vary both by content and format. In some embodiments, the advertisement may change depending on the type of user device being used to access the media.

In some embodiments, the selection of a version of any particular advertisement to be presented with a particular media listing may be based on the likelihood the media listing will be selected by a user. For example, a user may enter a web-site displaying a plurality of streaming media files. In anticipation of the user selecting one of the streaming media files, advertisements begin transmitting. Due to the bandwidth constraint, not all advertisement may be of the highest quality; therefore, only the advertisements associated with the media files the user is most likely to select are transmitted in high quality. The remaining advertisements are transmitted in a different quality such as low quality.

The remote server 620 (FIG. 6), the user device 610 (FIG. 6) or any device accessible via the communications network 670 (FIG. 6) may determine appropriate advertisements to associate with the media. The determination may be based on a user profile, which may detail a user's interests, viewing history, location, buying habits, and socio-economic data. In addition the time, date, environmental conditions, advertiser's preferences, and/or any other suitable method may be considered.

In addition, the devices may determine the likelihood that a user will select a particular media listing. The likelihood that any particular media will be selected may be based on a user's profile, as explained above, industry data, environmental conditions or the popularity of the associated media content. For example, it may be likely that a holiday program is selected during December, a full-length movie is selected if bandwidth conditions are favorable, or the most recent episode of a series is watched. Additionally, other factors such as the particular date, time, number of media listings and content may affect the computation. In addition, the particular algorithm used may base its computation on the mode, median, mean or other statistical probabilities, incorporating measures of variability and diversity such as standard deviation.

After determining the likelihood that a particular media listing will be selected, but before the user selects a media listing, remote server 620 (FIG. 6) or any device accessible via the communications network 670 (FIG. 6), may determine a particular version, or a set of versions, of the advertisement to present with the presentation of the media content related to the media listing. The versions of the advertisement may differ by quality, file size or format. For example, the first version of the first advertisement may have a first quality; the second version of the second advertisement may have a second quality. The quality of the versions may be different, for example one version may have a higher or lower quality than the other. In addition, some embodiments may include multiple versions of the each advertisement, all of which may be transmitted substantially simultaneously.

The remote server 620 (FIG. 6), the user device 610 (FIG. 6) or any device accessible via the communications network 670 (FIG. 6) may further base the selection of versions on the user profile, user history, environmental factors, or a selection criteria or algorithm. For example, if the connection between the user device 610 (FIG. 6) and the communications network 670 (FIG. 6) is high, the selected versions may have better quality. Alternatively, if the connection between the user device 610 (FIG. 6) and the communications network 670 (FIG. 6) is poor, the selected versions may have lower quality. In addition, the user profile or history may further affect the versions based on advertiser preferences. For example, if the user is likely to purchase a product after viewing a high quality advertisement, the selected versions may have higher quality.

After the versions have been selected, the remote server 620 (FIG. 6) or any device accessible via the communications network 670 may begin to transmit the selected versions to the user device 610 (FIG. 6) substantially simultaneously. Therefore, when the user finally selects a media listing, the amount of time that the user must wait for the pre-roll advertisement is minimized, and optimally zero.

In some embodiments, a first media listing and a second media listing are presented to a user on a user device 610 (FIG. 6) at step 1210. The media listings may be presented on the display 613 (FIG. 6) of the user device 610 (FIG. 6).

At step 1220, the remote server 620 (FIG. 6), the user device 610 (FIG. 6) or any device accessible via the communications network 670 (FIG. 6) may determine a first advertisement associated with the first media listing and a second advertisement associated with a second media listing. Using retrieved profile and industry information, the remote server 620 (FIG. 6), the user device 610 (FIG. 6) or any device accessible via the communications network 670 (FIG. 6) may determine the likelihood that the user will select the first media listing at step 1230, and may determine the likelihood the user will select the second media listing at step 1260.

At step 1230, if the likelihood the user will select the first media listing is high, the remote server 620 (FIG. 6) or any device accessible via the communications network 670 (FIG. 6) may initiate a transmission of a high quality version of the first advertisement at step 1240. If the likelihood the user will select the first media listing is low, the remote server 620 (FIG. 6) or any device accessible via the communications network 670 (FIG. 6) may initiate a transmission of a low quality version of the first advertisement at step 1250.

At step 1260, if the likelihood the user will select the second media listing is high, the remote server 620 (FIG. 6) or any device accessible via the communications network 670 (FIG. 6) may initiate a transmission of a high quality version of the second advertisement at step 1270. If the likelihood the user will select the second media listing is low, the remote server 620 (FIG. 6) or any device accessible via the communications network 670 (FIG. 6) may initiate a transmission of a low quality version of the second advertisement at step 1280.

The transmissions of the version of the first advertisement and the version of the second advertisement may be executed or performed in any order or sequence or may be executed or performed substantially simultaneously. The remote server 620 (FIG. 6) or any device accessible via the communications network 670 (FIG. 6) may initiate the transmission to the user device 610 (FIG. 6) using control circuitry of the processor 622 (FIG. 6) of the remote server 620 (FIG. 6), the processor 651 (FIG. 6) of the advertisement source 650 (FIG. 6), the processor 631 (FIG. 6) of the media listing source 630 (FIG. 6), or any other device accessible via the communications network 670 (FIG. 6).

Figure 13:
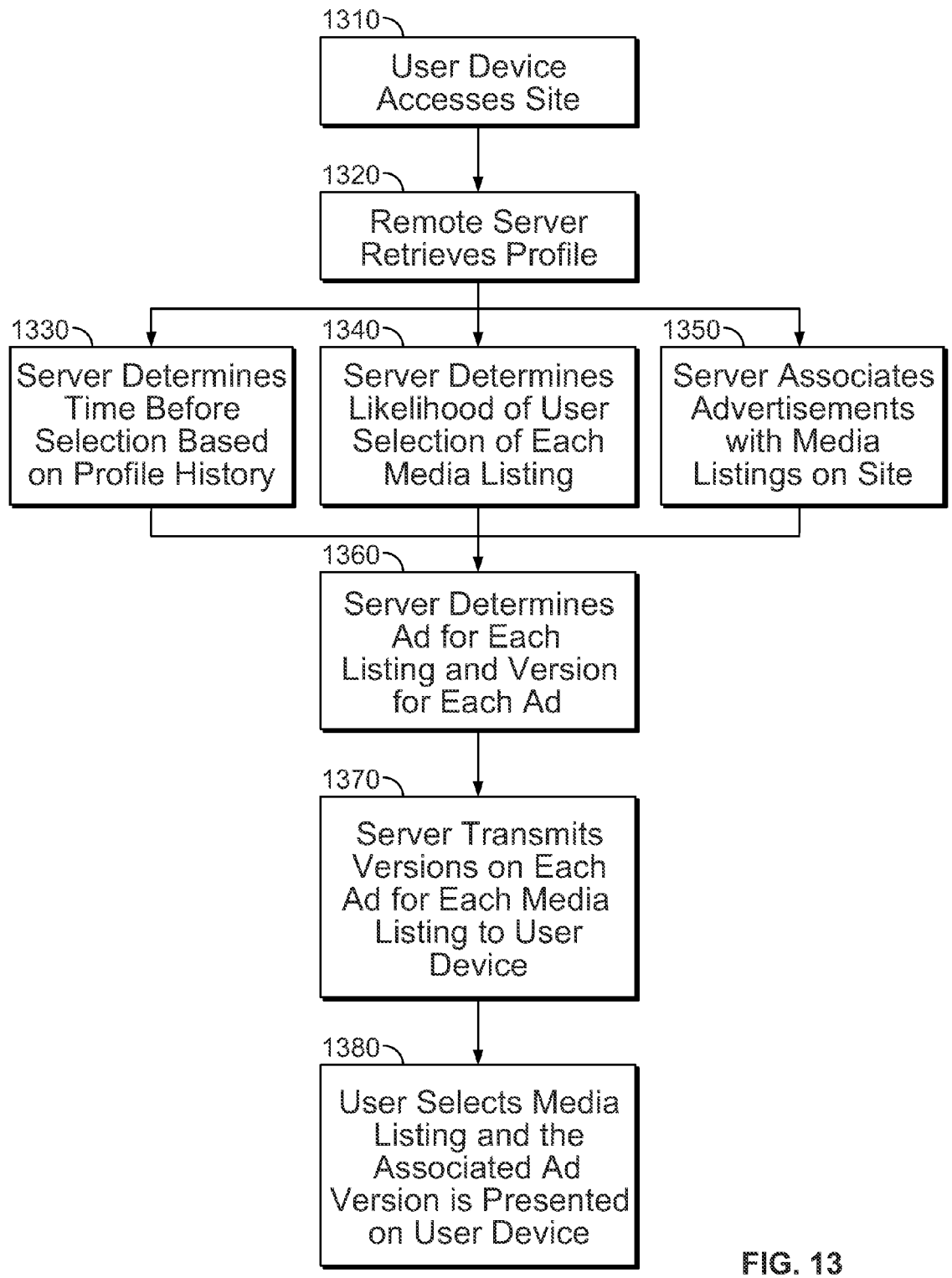
FIG. 13 is a flow-chart of illustrative steps involved in selecting a version of an advertisement to associate with a media listing in some embodiments of the disclosure.

FIG. 13 is also a flow-chart of illustrative steps involved in selecting a version of an advertisement to associate with a media listing in some embodiments. The advertisement version associated with each media listing, may be selected, or prioritized, based on the likelihood that the user will select each media listing. In this way, the versions of the advertisements are optimized based on the available bandwidth, and the likelihood that the user will experience a pause before the "pre-roll" advertisement is minimized. For example, a media listing with a high likelihood of user selection may have a high quality advertisement associated with it, while a media listing with a low likelihood of user selection is associated with a low quality advertisement.

In some embodiments, the user device 610 (FIG. 6) accesses a group of media listings at step 1310. For example, the user may view a web-site or an interactive television VOD guide. Upon accessing the group of media listings, the user device 610 may initiate a selection of advertisements based on a profile stored in the memory 616 of the user device 610 at step 1320. Alternatively, upon determining that the user device 610 (FIG. 6) has accessed a group of media listings, remote server 620 (FIG. 6) or any device accessible via the communications network 670 (FIG. 6) initiate a selection of advertisements.

The user device 610 may send, or the remote server may retrieve, the user profile for the user device 610 (FIG. 6). The user profile may be stored in the memory 616 (FIG. 6) of the user device 610 (FIG. 6) or on any device accessible via the communications network 670 (FIG. 6). For example, the user profile may be housed on the memory 652 of the advertisement source 650 (FIG. 6), the memory 632 of the media listing source 630, or the memory 621 of the remote server 620 (FIG. 6).

At step 1330, the remote server 620 (FIG. 6), the user device 610 (FIG. 6) or any device accessible via the communications network 670 (FIG. 6) may determine the likely time before the user makes a selection. The calculation may be based at least in part on an algorithm related to the user profile or industry information or any suitable method described above. At step 1340, the remote server 620 (FIG. 6), the user device 610 (FIG. 6) or any device accessible via the communications network 670 (FIG. 6) may determine the likelihood that the user will select each media listing at step 1340. At step 1350, the remote server 620 (FIG. 6), the user device 610 (FIG. 6) or any device accessible via the communications network 670 (FIG. 6) may associate advertisements with the media listings. Steps 1330, 1340 and 1350 may be executed or performed in any order or sequence, and the order and sequence or may be executed or performed substantially simultaneously where appropriate or in parallel to reduce latency and processing times.

At step 1360, the remote server 620 (FIG. 6), the user device 610 (FIG. 6) or any device accessible via the communications network 670 (FIG. 6) may associate an advertisement with each media listing and determine an advertisement version for each advertisement. The determination of an advertisement version may further consider the available bandwidth and allocation techniques discussed above.

At step 1370, the remote server 620 (FIG. 6) or any device accessible via the communications network 670 (FIG. 6) may transmit the versions for each advertisement to the user device 610 (FIG. 6). The transmissions of the versions of each advertisement may be executed or performed in any order or sequence or may be executed or performed substantially simultaneously. The order, sequence or allocation of bandwidth during substantially simultaneous transmission may incorporate the techniques discussed above. The remote server 620 (FIG. 6) or any device accessible via the communications network 670 (FIG. 6) may initiate the transmission to the user device 610 (FIG. 6) using control circuitry of the processor 622 (FIG. 6) of the remote server 620 (FIG. 6), the processor 651 (FIG. 6) of the advertisement source 650 (FIG. 6), the processor 631 (FIG. 6) of the media listing source 630 (FIG. 6), or any other device accessible via the communications network 670 (FIG. 6).

At step 1380, the remote server 620 (FIG. 6) or the user device 610 (FIG. 6) may receive a user selection of a media listing. This could occur through an input by the user into the user input interface 612 (FIG. 6) of the user device 610 or automatically based on an amount of lapsed time, user history or profile, or instructions from the remote server 620 (FIG. 6) or any device connected via the communications network 670 (FIG. 6).

In some embodiments, the quality of the video or other media may drop, or may be improved, due to available bandwidth. The user device 610 (FIG. 6) may inform the remote server 620 (FIG. 6) or any device accessible via the communications network 670 (FIG. 6), and the remote server 620 (FIG. 6) or any device accessible via the communications network 670 (FIG. 6) may further relay information to other devices. After determining that a user has viewed a particular advertisement or media content the user device 610 (FIG. 6) or any device accessible via the communications network 670 (FIG. 6) may also adjust the billing cost to the customer, the advertiser, or both. For example, the cost associated with lower quality advertisements or media content may be less than the cost associated with higher quality advertisements.

Figure 14:
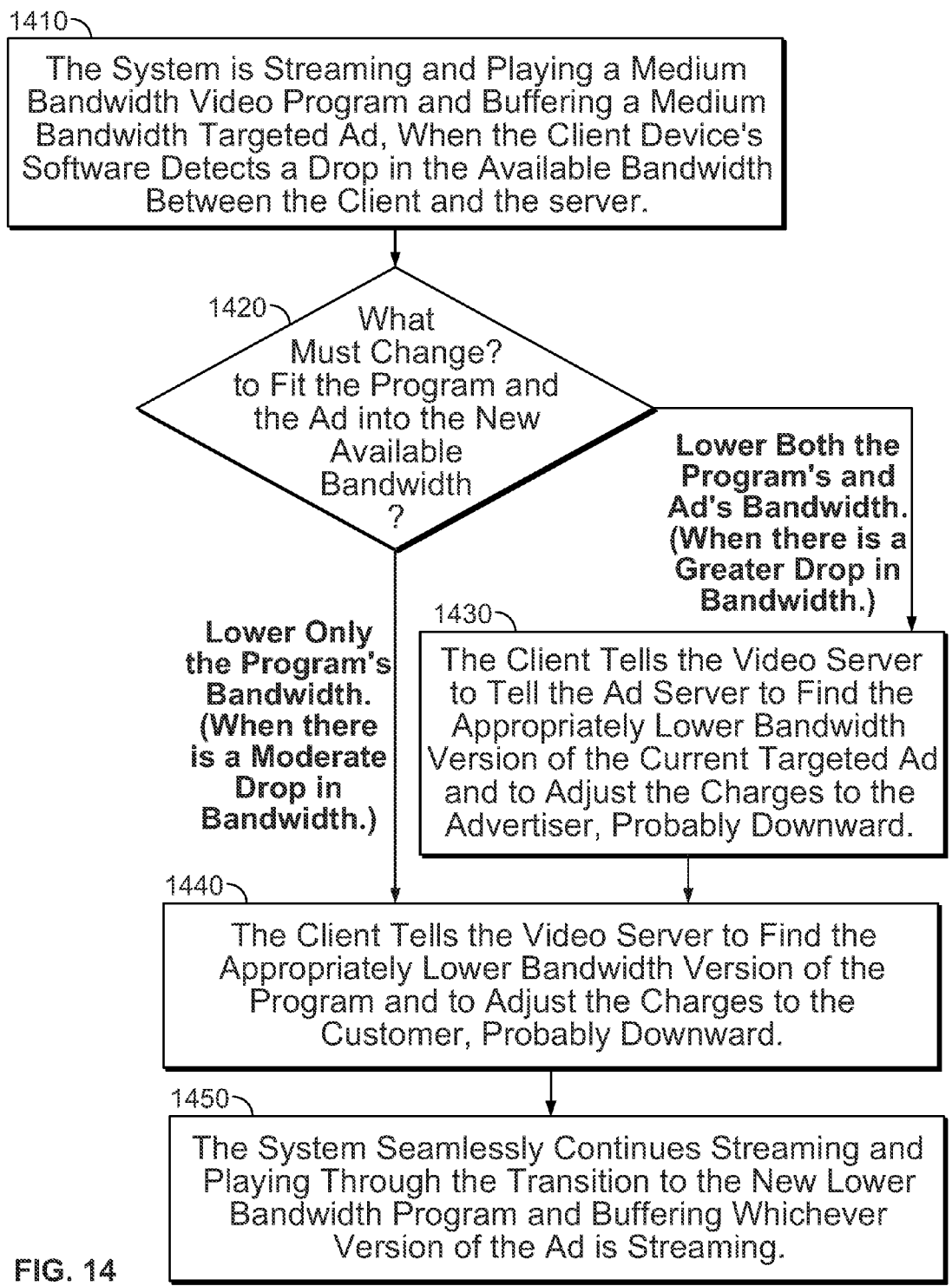
FIG. 14 is a flow-chart of illustrative steps involved in selecting a version of an advertisement to associate with a media listing in some embodiments of the disclosure and further monetizing the value associated with different quality advertisements.

FIG. 14 is a flow-chart of illustrative steps involved in selecting a version of an advertisement to associate with a media listing in some embodiments of the disclosure and further monetizing the value associated with different quality advertisements. At step 1410, the remote server 620 (FIG. 6) may be currently presenting media content to a user device 610 (FIG. 6). While the media content is being presented, an advertisement associated with the media content is being transmitted. For example, the system may be streaming and playing a medium quality video program and buffering a medium quality targeted advertisement. During the transmission, the user device 610 (FIG. 6) or any device accessible by the communications network 670 (FIG. 6) may detect a drop in the available bandwidth between the user device 610 (FIG. 6) and the device transmitting the media content, for example, the remote server 620 (FIG. 6).

The remote server 620 (FIG. 6), the user device 610 (FIG. 6), or any device accessible via the communications network 670 (FIG. 6) may determine what parameters must change to fit the video program and the advertisement into the new available bandwidth at step 1420. In one option, the remote server 620 (FIG. 6), the user device 610 (FIG. 6), or device accessible via the communications network 670 (FIG. 6) may lower the quality of the media content currently being presented. If so, the remote server 620 (FIG. 6), the user device 610 (FIG. 6), or any device accessible via the communications network 670 (FIG. 6) may request, or transmit, a lower quality version of the media content at step 1440. This approach may only be successful if there is a moderate drop in bandwidth.

A second option is to lower both the quality of the media content currently being presented and to lower the quality of the advertisement currently being transmitted. As shown in step 1430, the remote server 620 (FIG. 6), the user device 610 (FIG. 6), or any device accessible via the communications network 670 (FIG. 6), may request, or transmit, an appropriately lower quality version of the video program and the targeted advertisement. This may be necessary when there is a greater drop in the available bandwidth.

In either step 1430 or step 1440, there may be an adjustment to the charges to the customer and advertiser. However, the media content currently being presented (i.e. streamed) will continue uninterrupted, seamlessly transitioning to the advertisement currently being transmitted (i.e. buffered), albeit both may have a lower quality. The affects of the lower quality presentation may be further mitigated as a user may be unaware of small deviations in quality.

Figure 15:
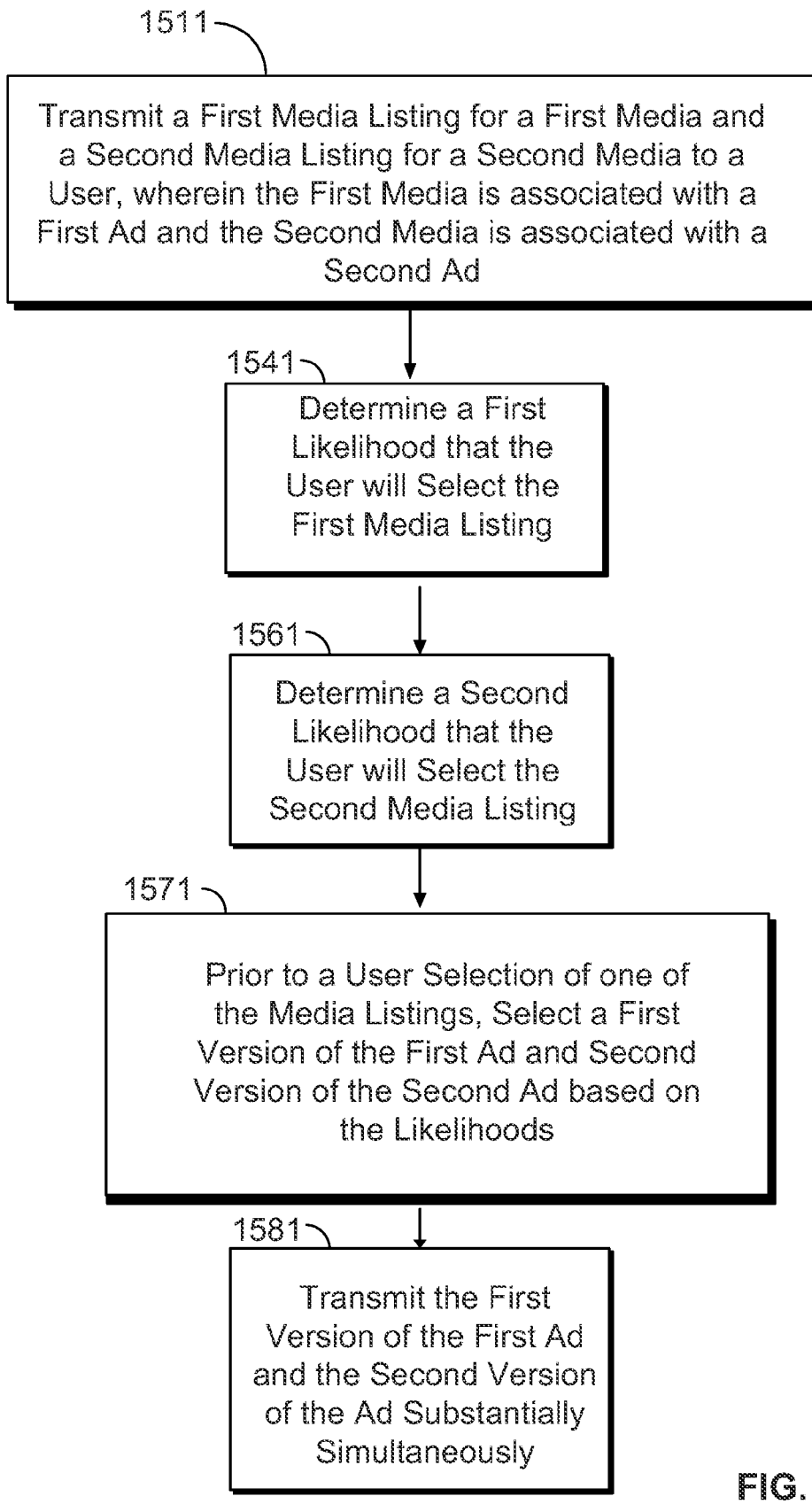
FIG. 15 is a flow-chart of illustrative steps involved in selecting a version of an advertisement in some embodiments of the disclosure.

FIG. 15 is a flow-chart of illustrative steps involved in a method in some embodiments of the disclosure. At step 1511, the method includes transmitting a first media listing for a first media and a second media listing for a second media to a user, wherein the first media is associated with a first advertisement and the second media is associated with a second advertisement. At step 1541, the method includes determining a first likelihood that the user will select the first media listing. At step 1561 the method includes determining a second likelihood that the user will select the second media listing. At step 1571, prior to a user selection of one of the media listings, the method includes selecting a first version of the first advertisement and a second version of the second advertisement based on the determined likelihoods. At step 1581, the method includes transmitting the first version of the first advertisement and the second version of the second advertisement substantially simultaneously.

Figure 16:
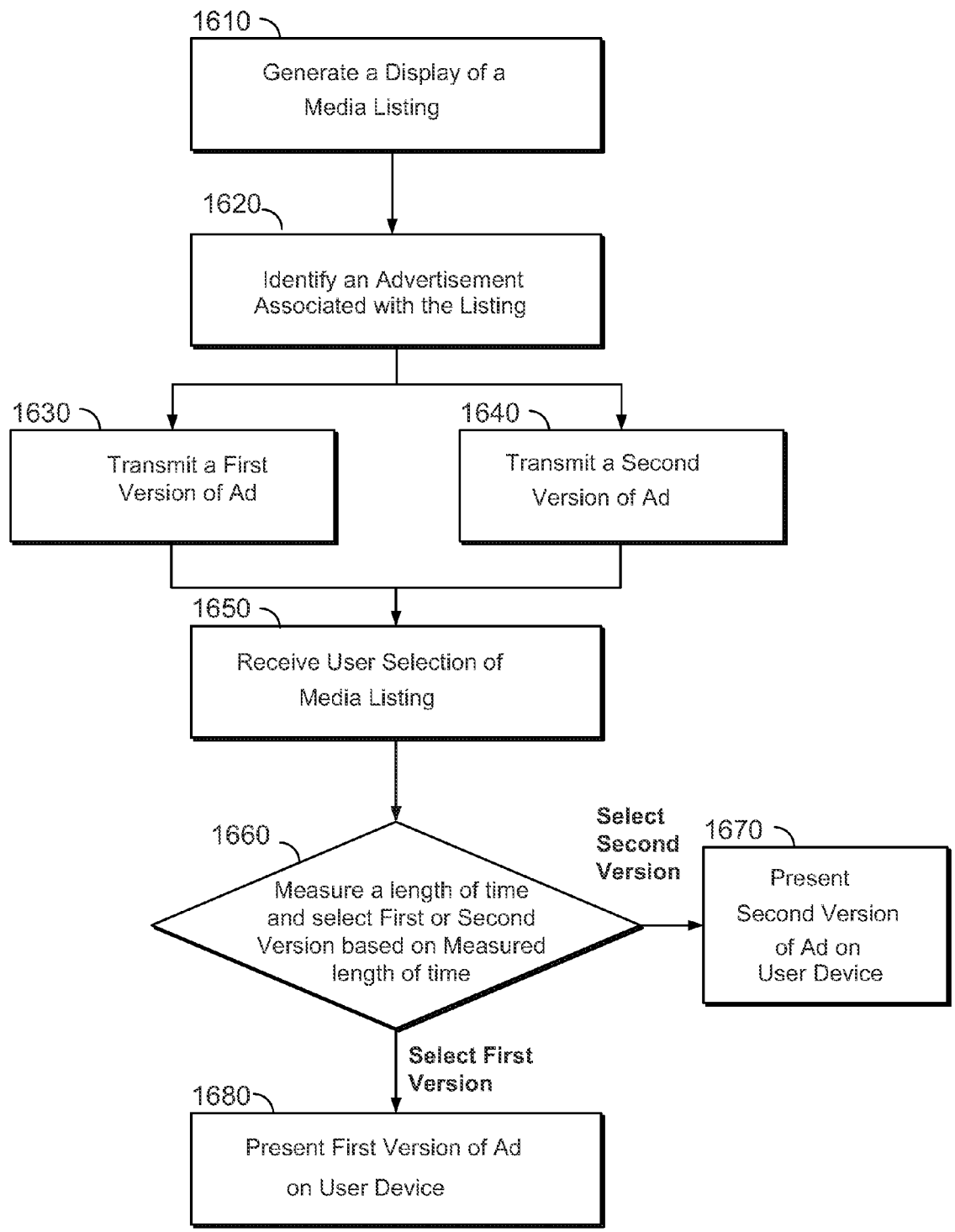
FIG. 16 is a flow-chart of illustrative steps involved in selecting a version of an advertisement in some embodiments of the disclosure.

FIG. 16 is a flow-chart of illustrative steps involved in a method in some embodiments of the disclosure. At step 1610, the method includes generating a display that includes a listing. At step 1620, the method includes identifying an advertisement associated with the listing. At step 1630 and 1640, while a user is presented with the listing, the method includes transmitting substantially simultaneously, a first version of the advertisement and a second version of the advertisement. At step 1650, the method includes receiving a user selection of the listing. At step 1660, the method includes measuring a length of time between the start of the transmitting and the receipt of the user selection, and selecting, for presentation, either the first version of the advertisement at step 1680 or the second version of the advertisement at step 1670 based on the measured length of time.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flow charts or examples relating to one embodiment may be combined with any other embodiment in a suitable manner, done in different orders, or in done in parallel. The systems and methods may be performed using a combination of software and hardware and any device listing in FIGS. 3, 4 and 6 may be capable of performing the embodiments described herein. In addition, features and embodiments described in relation to advertisements, advertisement versions, or advertisement segments may be applied to media content, media content versions, or media content segments.

What is claimed is:

1. A method comprising:
generating a display that includes a listing;
identifying an advertisement associated with the listing;
while a user is presented with the listing, transmitting substantially simultaneously, a first version of the advertisement and a second version of the advertisement;
receiving a user selection of the listing;
measuring a length of time between the start of the transmitting and the receipt of the user selection; and
selecting, for presentation, either the first version of the advertisement or the second version of the advertisement based on the measured length of time.

2. The method of claim 1, wherein the first version of the advertisement has a first quality and the second version of the advertisement has a second quality.

3. The method of claim 2, wherein the quality of the first version of the advertisement is different than the quality of the second version of the advertisement.

4. The method of claim 1, wherein determining the version of the advertisement selected is further based on link speed.

5. The method of claim 1, further comprising presenting the selected version of the advertisement.

6. The method of claim 5, further comprising:
after presenting either the first version of the advertisement or the second version of the advertisement, determining a point to stop presenting the presented version and begin presenting an un-presented version of the advertisement.

7. The method of claim 6, wherein the point is determined by
determining an amount of the presented version of the advertisement and an amount the un-presented version of the advertisement received by a user device; and
determining how much of the presented version of the advertisement and the un-presented version of the advertisement must be further transmitted.

8. The method of claim 7, wherein determining the point is further based on link speed.

9. The method of claim 7, wherein determining the point is further based on a quality of a media listing selected by a user.

10. The method of claim 1, wherein the second version of the advertisement is transmitted in reverse.

11. The method of claim 1, wherein the transmission of the second version of the advertisement begins at a different point in the advertisement than the transmission of the first version of the advertisement.

12. A system for presenting an advertisement, comprising:
a server configured to:
generate a display that includes a listing;
identify an advertisement associated with the listing;
while a user is presented with the listing, transmit substantially simultaneously, a first version of the advertisement and a second version of the advertisement;
receive a user selection of the listing;
measure a length of time between the start of the transmitting and the receipt of the user selection; and
select for presentation either the first version of the advertisement or the second version of the advertisement based on the length of time.

13. The system of claim 12, wherein the first version of the advertisement has a first quality and the second version of the advertisement has a second quality.

14. The system of claim 13, wherein the quality of the first version of the advertisement is different than the quality of the second version of the advertisement.

15. The system of claim 12, wherein the version of the advertisement selected is further based on link speed.

16. The system of claim 12, wherein the server is further configured to present the selected version of the advertisement.

17. The system of claim 16, wherein the server is further configured to determine a point to stop the instruction to present either the first version of the advertisement or the second version of the advertisement and generate an instruction to present an un-presented version of the advertisement.

18. The system of claim 17, wherein the point is determined by
determining an amount of the presented version of the advertisement and an amount of the un-presented version of the advertisement received by a user device; and
determining how much of the presented version of the advertisement and the un-presented version of the advertisement must be further transmitted.

19. The system of claim 18, wherein the point is further determined based on link speed.

20. The system of claim 18, wherein the point is further determined based on a quality of a media listing selected by a user.

21. The system of claim 12, wherein the second version of the advertisement is transmitted in reverse.

22. The system of claim 12, wherein the transmission of the second version of the advertisement begins at a different point in the advertisement than the transmission of the first version of the advertisement.

* * * * *